US009516370B1

United States Patent
Weel

(10) Patent No.: US 9,516,370 B1
(45) Date of Patent: Dec. 6, 2016

(54) METHOD, DEVICE, AND SYSTEM FOR DIRECTING A WIRELESS SPEAKER FROM A MOBILE PHONE TO RECEIVE AND RENDER A PLAYLIST FROM A CONTENT SERVER ON THE INTERNET

(71) Applicant: Black Hills Media, LLC, Wilmington, DE (US)

(72) Inventor: Martin Weel, Modjeska, CA (US)

(73) Assignee: Black Hills Media, LLC, Wilmington, DE (US)

( * ) Notice: Subject to any disclaimer, the term of this patent is extended or adjusted under 35 U.S.C. 154(b) by 85 days.

(21) Appl. No.: 14/311,690

(22) Filed: Jun. 23, 2014

Related U.S. Application Data

(63) Continuation of application No. 13/539,923, filed on Jul. 2, 2012, which is a continuation of application No. 13/207,113, filed on Aug. 10, 2011, now Pat. No. 8,214,873, which is a continuation of application No. 10/840,109, filed on May 5, 2004, now Pat. No. 8,028,323.

(51) Int. Cl.
*H04N 21/41* (2011.01)

(52) U.S. Cl.
CPC .................. *H04N 21/4126* (2013.01)

(58) Field of Classification Search
CPC ..... H04L 67/16; H04L 67/10; H04L 69/329; H04L 67/02; H04L 67/12; H04L 67/24; H04L 12/581; H04L 51/00; G06F 3/002; H04N 2005/4407; H04N 21/4622; Y10S 707/99933; G11B 27/34
See application file for complete search history.

(56) References Cited

U.S. PATENT DOCUMENTS

| | | | |
|---|---|---|---|
| 3,291,919 | A | 12/1966 | Robitaille |
| 3,609,227 | A | 9/1971 | Kuljian |
| 4,357,710 | A | 11/1982 | Kramer et al. |
| 4,682,370 | A | 7/1987 | Matthews |
| 4,720,873 | A | 1/1988 | Goodman et al. |
| 4,788,675 | A | 11/1988 | Jones et al. |
| 4,829,500 | A | 5/1989 | Saunders |
| 4,920,432 | A | 4/1990 | Eggers et al. |
| 5,035,438 | A | 7/1991 | Cronquist |

(Continued)

FOREIGN PATENT DOCUMENTS

| | | |
|---|---|---|
| CN | 1276126 | 12/2000 |
| CN | 1477877 | 2/2004 |

(Continued)

*Primary Examiner* — Ping Hsieh
*Assistant Examiner* — James Yang

(57) ABSTRACT

Methods, systems, and devices are presented for facilitating a presentation of media, including displaying, on a touch-screen of a mobile phone, a plurality of device identifiers; receiving input identifying one of the plurality of device identifiers that identifies a rendering device; providing information identifying a user of the mobile phone; receiving a message based on the information identifying the user of the mobile phone, the message comprising information identifying a playlist comprising a plurality of media item identifiers corresponding to media items ordered to be played in an arranged sequence; receiving, at the mobile phone, input identifying at least one media item identifier from the playlist; and directing, from the mobile phone, the rendering device to obtain a media item identified by the at least one media item identifier from a content server and to play the media item, the media item obtained without user input at the rendering device.

65 Claims, 8 Drawing Sheets

(56) References Cited

U.S. PATENT DOCUMENTS

| | | |
|---|---|---|
| 5,119,188 A | 6/1992 | McCalley et al. |
| 5,127,003 A | 6/1992 | Doll, Jr. et al. |
| 5,129,036 A | 7/1992 | Dean et al. |
| 5,132,992 A | 7/1992 | Yurt et al. |
| 5,134,719 A | 7/1992 | Mankovitz |
| 5,168,481 A | 12/1992 | Culbertson et al. |
| 5,189,630 A | 2/1993 | Barstow et al. |
| 5,191,573 A | 3/1993 | Hair |
| 5,192,999 A | 3/1993 | Graczyk et al. |
| 5,215,466 A | 6/1993 | Rubio |
| 5,262,875 A | 11/1993 | Mincer et al. |
| 5,282,028 A | 1/1994 | Johnson et al. |
| 5,305,438 A | 4/1994 | MacKay et al. |
| 5,349,678 A | 9/1994 | Morris et al. |
| 5,351,276 A | 9/1994 | Doll, Jr. et al. |
| 5,355,302 A | 10/1994 | Martin et al. |
| 5,396,417 A | 3/1995 | Burks et al. |
| 5,414,455 A | 5/1995 | Hooper et al. |
| 5,418,713 A | 5/1995 | Allen |
| 5,440,334 A | 8/1995 | Walters et al. |
| 5,440,336 A | 8/1995 | Buhro et al. |
| 5,442,701 A | 8/1995 | Guillou et al. |
| 5,455,570 A | 10/1995 | Cook et al. |
| 5,475,835 A | 12/1995 | Hickey |
| 5,481,535 A | 1/1996 | Hershey |
| 5,512,935 A | 4/1996 | Majeti et al. |
| 5,526,284 A | 6/1996 | Mankovitz |
| 5,534,913 A | 7/1996 | Majeti et al. |
| 5,539,635 A | 7/1996 | Larson, Jr. |
| 5,544,161 A | 8/1996 | Bigham et al. |
| 5,550,576 A | 8/1996 | Klosterman |
| 5,553,126 A | 9/1996 | Tang |
| 5,557,541 A | 9/1996 | Schulhof et al. |
| 5,568,645 A | 10/1996 | Morris et al. |
| 5,570,134 A | 10/1996 | Hong |
| 5,572,442 A | 11/1996 | Schulhof et al. |
| 5,577,128 A | 11/1996 | Farinelli |
| 5,581,461 A | 12/1996 | Coll et al. |
| 5,581,479 A | 12/1996 | McLaughlin et al. |
| 5,583,763 A | 12/1996 | Atcheson et al. |
| 5,592,511 A | 1/1997 | Schoen et al. |
| 5,594,779 A | 1/1997 | Goodman |
| 5,616,876 A | 4/1997 | Cluts |
| 5,617,565 A | 4/1997 | Augenbraun et al. |
| 5,618,045 A | 4/1997 | Kagan |
| 5,625,608 A | 4/1997 | Grewe et al. |
| 5,629,867 A | 5/1997 | Goldman |
| 5,636,211 A | 6/1997 | Newlin et al. |
| 5,640,193 A | 6/1997 | Wellner |
| 5,652,841 A | 7/1997 | Nemirovsky et al. |
| 5,654,886 A | 8/1997 | Zereski, Jr. et al. |
| 5,661,787 A | 8/1997 | Pocock |
| 5,671,436 A | 9/1997 | Morris et al. |
| 5,673,322 A | 9/1997 | Pepe et al. |
| 5,682,525 A | 10/1997 | Bouve et al. |
| 5,684,799 A | 11/1997 | Bigham et al. |
| 5,703,795 A | 12/1997 | Mankovitz |
| 5,706,427 A | 1/1998 | Tabuki |
| 5,710,970 A | 1/1998 | Walters et al. |
| 5,721,827 A | 2/1998 | Logan et al. |
| 5,727,048 A | 3/1998 | Hiroshima et al. |
| 5,732,216 A | 3/1998 | Logan et al. |
| 5,734,719 A | 3/1998 | Tsevdos et al. |
| 5,734,893 A | 3/1998 | Li et al. |
| 5,758,257 A | 5/1998 | Herz et al. |
| 5,768,527 A | 6/1998 | Zhu et al. |
| 5,781,889 A | 7/1998 | Martin |
| 5,790,426 A | 8/1998 | Robinson |
| 5,790,935 A | 8/1998 | Payton |
| 5,793,980 A | 8/1998 | Glaser et al. |
| 5,794,217 A | 8/1998 | Allen |
| 5,796,727 A | 8/1998 | Harrison et al. |
| 5,805,154 A | 9/1998 | Brown |
| 5,809,246 A | 9/1998 | Goldman |
| 5,812,765 A | 9/1998 | Curtis |
| 5,812,937 A | 9/1998 | Takahisa et al. |
| 5,815,662 A | 9/1998 | Ong |
| 5,818,510 A | 10/1998 | Cobbley et al. |
| 5,818,512 A | 10/1998 | Fuller |
| 5,819,160 A | 10/1998 | Foladare et al. |
| 5,819,273 A | 10/1998 | Vora et al. |
| 5,828,839 A | 10/1998 | Moncreiff |
| 5,832,499 A | 11/1998 | Gustman |
| 5,844,893 A | 12/1998 | Gollnick et al. |
| 5,850,340 A | 12/1998 | York |
| 5,852,610 A | 12/1998 | Olaniyan |
| 5,855,015 A | 12/1998 | Shoham |
| 5,857,149 A | 1/1999 | Suzuki |
| 5,862,171 A | 1/1999 | Mahany |
| 5,864,682 A | 1/1999 | Porter et al. |
| 5,870,390 A | 2/1999 | Campanella |
| 5,874,986 A | 2/1999 | Gibbon et al. |
| 5,878,223 A | 3/1999 | Becker et al. |
| 5,878,429 A | 3/1999 | Morris et al. |
| 5,880,721 A | 3/1999 | Yen |
| 5,884,048 A | 3/1999 | Takano |
| 5,884,282 A | 3/1999 | Robinson |
| 5,890,152 A | 3/1999 | Rapaport et al. |
| 5,903,892 A | 5/1999 | Ali et al. |
| 5,903,901 A | 5/1999 | Kawakura et al. |
| 5,905,865 A | 5/1999 | Palmer et al. |
| 5,907,831 A | 5/1999 | Lotvin et al. |
| 5,914,941 A | 6/1999 | Janky |
| 5,918,223 A | 6/1999 | Blum et al. |
| 5,920,856 A | 7/1999 | Syeda-Mahmood |
| 5,923,902 A | 7/1999 | Inagaki |
| 5,926,624 A | 7/1999 | Katz et al. |
| 5,930,765 A | 7/1999 | Martin |
| 5,933,822 A | 8/1999 | Braden-Harder et al. |
| 5,943,422 A | 8/1999 | Van Wie et al. |
| 5,948,084 A | 9/1999 | Ha |
| 5,949,492 A | 9/1999 | Mankovitz |
| 5,949,776 A | 9/1999 | Mahany et al. |
| 5,949,877 A | 9/1999 | Traw et al. |
| 5,953,005 A | 9/1999 | Liu |
| 5,956,716 A | 9/1999 | Kenner et al. |
| 5,959,945 A | 9/1999 | Kleiman |
| 5,968,120 A | 10/1999 | Guedalia |
| 5,973,722 A | 10/1999 | Wakai et al. |
| 5,973,724 A | 10/1999 | Riddle |
| 5,974,441 A | 10/1999 | Rogers et al. |
| 5,983,200 A | 11/1999 | Slotznick |
| 5,983,218 A | 11/1999 | Syeda-Mahmood |
| 5,986,692 A | 11/1999 | Logan et al. |
| 5,990,868 A | 11/1999 | Frederick |
| 5,991,306 A | 11/1999 | Burns et al. |
| 5,991,693 A | 11/1999 | Zalewski |
| 5,991,737 A | 11/1999 | Chen |
| 6,005,563 A | 12/1999 | White et al. |
| 6,006,225 A | 12/1999 | Bowman et al. |
| 6,009,422 A | 12/1999 | Ciccarelli |
| 6,012,086 A | 1/2000 | Lowell |
| 6,014,569 A | 1/2000 | Bottum |
| 6,018,768 A | 1/2000 | Ullman et al. |
| 6,026,150 A | 2/2000 | Frank et al. |
| 6,029,165 A | 2/2000 | Gable |
| 6,032,202 A | 2/2000 | Lea |
| 6,035,350 A | 3/2000 | Swamy et al. |
| 6,038,591 A | 3/2000 | Wolfe et al. |
| 6,038,601 A | 3/2000 | Kemper et al. |
| 6,038,668 A | 3/2000 | Chipman et al. |
| 6,041,311 A | 3/2000 | Chislenko et al. |
| 6,041,326 A | 3/2000 | Amro et al. |
| 6,051,389 A | 4/2000 | Ahl et al. |
| 6,055,566 A | 4/2000 | Kikinis |
| 6,060,997 A | 5/2000 | Taubenheim et al. |
| 6,064,379 A | 5/2000 | DeMoney |
| 6,067,562 A | 5/2000 | Goldman |
| 6,081,780 A | 6/2000 | Lumelsky |
| 6,081,830 A | 6/2000 | Schindler |
| 6,088,455 A | 7/2000 | Logan et al. |
| 6,088,722 A | 7/2000 | Herz et al. |
| 6,092,142 A | 7/2000 | Mehta |
| 6,093,880 A | 7/2000 | Arnalds |

(56) References Cited

U.S. PATENT DOCUMENTS

| | | |
|---|---|---|
| 6,104,334 A | 8/2000 | Allport |
| 6,105,060 A | 8/2000 | Rothblatt |
| 6,108,686 A | 8/2000 | Williams, Jr. |
| 6,122,658 A | 9/2000 | Chaddha |
| 6,122,757 A | 9/2000 | Kelley |
| 6,125,387 A | 9/2000 | Simonoff et al. |
| 6,127,941 A | 10/2000 | Van Ryzin |
| 6,128,663 A | 10/2000 | Thomas |
| 6,131,130 A | 10/2000 | Van Ryzin |
| 6,134,590 A | 10/2000 | Perlman |
| 6,144,375 A | 11/2000 | Jain et al. |
| 6,157,411 A | 12/2000 | Williams et al. |
| 6,160,997 A | 12/2000 | Oberlaender |
| 6,161,132 A | 12/2000 | Roberts |
| 6,161,142 A | 12/2000 | Wolfe et al. |
| 6,166,735 A | 12/2000 | Dom et al. |
| 6,167,393 A | 12/2000 | Davis, III et al. |
| 6,169,573 B1 | 1/2001 | Sampath-Kumar et al. |
| 6,182,128 B1 | 1/2001 | Kelkar et al. |
| 6,192,340 B1 | 2/2001 | Abecassis |
| 6,195,436 B1 | 2/2001 | Scibora et al. |
| 6,195,654 B1 | 2/2001 | Wachtel |
| 6,195,657 B1 | 2/2001 | Rucker et al. |
| 6,199,076 B1 | 3/2001 | Logan et al. |
| D440,553 S | 4/2001 | Bolas et al. |
| 6,212,282 B1 | 4/2001 | Mershon |
| 6,223,210 B1 | 4/2001 | Hickey |
| 6,226,672 B1 | 5/2001 | DeMartin et al. |
| 6,229,621 B1 | 5/2001 | Kulakowski et al. |
| 6,233,430 B1 | 5/2001 | Helferich |
| 6,233,682 B1 | 5/2001 | Fritsch |
| 6,243,725 B1 | 6/2001 | Hempleman et al. |
| 6,243,760 B1 | 6/2001 | Armbruster et al. |
| 6,246,672 B1 | 6/2001 | Lumelsky |
| 6,248,946 B1 | 6/2001 | Dwek |
| 6,253,069 B1 | 6/2001 | Mankovitz |
| 6,253,193 B1 | 6/2001 | Ginter |
| 6,255,961 B1 | 7/2001 | Van Ryzin et al. |
| 6,256,303 B1 | 7/2001 | Drakoulis et al. |
| 6,256,554 B1 | 7/2001 | DiLorenzo |
| 6,263,503 B1 | 7/2001 | Margulis |
| 6,263,507 B1 | 7/2001 | Ahmad et al. |
| 6,289,165 B1 | 9/2001 | Abecassis |
| 6,292,786 B1 | 9/2001 | Deaton et al. |
| 6,295,093 B1 | 9/2001 | Park et al. |
| 6,295,555 B1 | 9/2001 | Goldman |
| 6,311,194 B1 | 10/2001 | Sheth et al. |
| 6,314,094 B1 | 11/2001 | Boys |
| 6,317,722 B1 | 11/2001 | Jacobi et al. |
| 6,317,784 B1 | 11/2001 | Mackintosh et al. |
| 6,334,127 B1 | 12/2001 | Bieganski et al. |
| 6,335,927 B1 | 1/2002 | Elliott et al. |
| 6,338,044 B1 | 1/2002 | Cook et al. |
| 6,339,693 B1 | 1/2002 | Chan |
| 6,344,607 B2 | 2/2002 | Cliff |
| 6,345,289 B1 | 2/2002 | Lotspiech et al. |
| 6,349,329 B1 | 2/2002 | Mackintosh et al. |
| 6,349,339 B1 | 2/2002 | Williams |
| 6,351,596 B1 | 2/2002 | Ostrover |
| 6,351,733 B1 | 2/2002 | Saunders et al. |
| 6,354,748 B1 | 3/2002 | Vrvilo |
| 6,372,974 B1 | 4/2002 | Gross et al. |
| 6,374,237 B1 | 4/2002 | Reese |
| 6,377,782 B1 | 4/2002 | Bishop et al. |
| 6,385,596 B1 | 5/2002 | Wiser et al. |
| 6,389,469 B1 | 5/2002 | Vekslar et al. |
| 6,407,750 B1 | 6/2002 | Gioscia et al. |
| 6,411,992 B1 | 6/2002 | Srinivasan et al. |
| 6,415,282 B1 | 7/2002 | Mukherjea et al. |
| 6,438,579 B1 | 8/2002 | Hosken |
| 6,446,080 B1 | 9/2002 | Van Ryzin et al. |
| 6,456,234 B1 | 9/2002 | Johnson |
| 6,460,076 B1 | 10/2002 | Srinivasan |
| 6,473,792 B1 | 10/2002 | Yavitz |
| 6,477,707 B1 | 11/2002 | King et al. |
| 6,487,390 B1 | 11/2002 | Virine et al. |
| 6,496,122 B2 | 12/2002 | Sampsell |
| 6,496,802 B1 | 12/2002 | van Zoest et al. |
| 6,501,389 B1 | 12/2002 | Aguirre |
| 6,502,194 B1 | 12/2002 | Berman et al. |
| 6,505,123 B1 | 1/2003 | Root et al. |
| 6,505,160 B1 | 1/2003 | Levy et al. |
| 6,507,727 B1 | 1/2003 | Henrick |
| 6,519,770 B2 | 2/2003 | Ford |
| 6,526,335 B1 | 2/2003 | Treyz et al. |
| 6,526,411 B1 | 2/2003 | Ward |
| 6,546,421 B1 | 4/2003 | Wynblatt et al. |
| 6,546,555 B1 | 4/2003 | Hjelsvold et al. |
| 6,549,942 B1 | 4/2003 | Janky |
| 6,560,651 B2 | 5/2003 | Katz et al. |
| 6,567,847 B1 | 5/2003 | Inoue |
| 6,581,103 B1 | 6/2003 | Dengler |
| 6,587,127 B1 | 7/2003 | Leeke et al. |
| 6,600,898 B1 | 7/2003 | De Bonet et al. |
| 6,601,103 B1 | 7/2003 | Goldschmidt |
| 6,608,907 B1 | 8/2003 | Lee |
| 6,609,039 B1 | 8/2003 | Schoen |
| 6,609,096 B1 | 8/2003 | De Bonet et al. |
| 6,615,039 B1 | 9/2003 | Eldering |
| 6,622,018 B1 | 9/2003 | Erekson |
| 6,628,928 B1 | 9/2003 | Crosby et al. |
| 6,631,410 B1 | 10/2003 | Kowalski et al. |
| 6,640,145 B2 | 10/2003 | Hoffberg et al. |
| 6,643,376 B1 | 11/2003 | Ackerman |
| 6,647,389 B1 | 11/2003 | Fitch et al. |
| 6,647,411 B2 | 11/2003 | Towell et al. |
| 6,647,417 B1 | 11/2003 | Hunter et al. |
| 6,657,116 B1 | 12/2003 | Gunnerson |
| 6,662,231 B1 | 12/2003 | Drosset et al. |
| 6,670,537 B2 | 12/2003 | Hughes et al. |
| 6,675,015 B1 | 1/2004 | Martini et al. |
| 6,675,268 B1 | 1/2004 | DeKoning et al. |
| 6,675,384 B1 | 1/2004 | Block et al. |
| 6,678,215 B1 | 1/2004 | Treyz et al. |
| 6,684,249 B1 | 1/2004 | Frerichs et al. |
| 6,690,657 B1 | 2/2004 | Lau |
| 6,697,824 B1 | 2/2004 | Bowman-Amuah |
| 6,701,355 B1 | 3/2004 | Brandt et al. |
| 6,711,622 B1 | 3/2004 | Fuller et al. |
| 6,711,741 B2 | 3/2004 | Yeo |
| 6,721,403 B1 | 4/2004 | Mandalia |
| 6,725,461 B1 | 4/2004 | Dougherty et al. |
| 6,728,585 B2 | 4/2004 | Neoh |
| 6,741,869 B1 | 5/2004 | Lehr |
| 6,748,237 B1 | 6/2004 | Bates et al. |
| 6,754,468 B1 | 6/2004 | Sieben et al. |
| 6,769,028 B1 | 7/2004 | Sass et al. |
| 6,772,127 B2 | 8/2004 | Saunders et al. |
| 6,779,115 B1 | 8/2004 | Naim |
| 6,782,253 B1 | 8/2004 | Shteyn et al. |
| 6,792,280 B1 | 9/2004 | Hori et al. |
| 6,792,470 B2 | 9/2004 | Hakenberg et al. |
| 6,793,142 B2 | 9/2004 | Yap |
| 6,823,225 B1 | 11/2004 | Sass |
| 6,826,283 B1 | 11/2004 | Wheeler et al. |
| 6,829,475 B1 | 12/2004 | Lee et al. |
| 6,839,705 B1 | 1/2005 | Grooters |
| 6,853,841 B1 | 2/2005 | St. Pierre |
| 6,865,600 B1 | 3/2005 | Brydon et al. |
| 6,865,609 B1 | 3/2005 | Gubbi |
| 6,876,642 B1 | 4/2005 | Adams et al. |
| 6,876,643 B1 | 4/2005 | Aggarwal |
| 6,879,963 B1 | 4/2005 | Rosenberg |
| 6,882,299 B1 | 4/2005 | Allport |
| 6,882,641 B1 | 4/2005 | Gallick et al. |
| 6,892,230 B1 | 5/2005 | Gu |
| 6,925,489 B1 | 8/2005 | Curtin |
| 6,933,433 B1 | 8/2005 | Porteus et al. |
| 6,937,860 B2 | 8/2005 | Jahn |
| 6,946,988 B2 | 9/2005 | Edwards et al. |
| 6,947,571 B1 | 9/2005 | Rhoads et al. |
| 6,954,443 B2 | 10/2005 | Forstadius et al. |
| 6,954,763 B2 | 10/2005 | Nunome et al. |
| 6,970,127 B2 | 11/2005 | Rakib |

(56) References Cited

U.S. PATENT DOCUMENTS

| | | |
|---|---|---|
| 6,970,703 B2 | 11/2005 | Fuchs et al. |
| 6,973,476 B1 | 12/2005 | Naden et al. |
| 6,975,266 B2 | 12/2005 | Abraham et al. |
| 6,981,040 B1 | 12/2005 | Konig et al. |
| 6,982,780 B2 | 1/2006 | Morley et al. |
| 6,985,694 B1 | 1/2006 | De Bonet et al. |
| 6,990,208 B1 | 1/2006 | Lau et al. |
| 6,990,497 B2 | 1/2006 | O'Rourke et al. |
| 6,993,532 B1 | 1/2006 | Platt et al. |
| 6,999,783 B2 | 2/2006 | Toyryla et al. |
| 7,000,188 B1 | 2/2006 | Eustace |
| 7,010,263 B1 | 3/2006 | Patsiokas |
| 7,010,613 B1 | 3/2006 | Connor |
| 7,020,704 B1 | 3/2006 | Lipscomb et al. |
| 7,020,710 B2 | 3/2006 | Weber et al. |
| 7,022,905 B1 | 4/2006 | Hinman et al. |
| 7,028,082 B1 | 4/2006 | Rosenberg et al. |
| 7,028,327 B1 | 4/2006 | Dougherty et al. |
| 7,031,931 B1 | 4/2006 | Meyers |
| 7,035,871 B2 | 4/2006 | Hunt et al. |
| 7,035,912 B2 | 4/2006 | Arteaga |
| 7,043,477 B2 | 5/2006 | Mercer et al. |
| 7,047,092 B2 | 5/2006 | Wimsatt |
| 7,047,315 B1 | 5/2006 | Srivastava |
| 7,058,694 B1 | 6/2006 | De Bonet et al. |
| 7,061,482 B2 | 6/2006 | Ferris |
| 7,065,342 B1 | 6/2006 | Rolf |
| 7,065,579 B2 | 6/2006 | Traversat |
| 7,072,309 B2 | 7/2006 | Xie et al. |
| 7,072,932 B1 | 7/2006 | Stahl |
| 7,075,000 B2 | 7/2006 | Gang et al. |
| 7,076,204 B2 | 7/2006 | Richenstein |
| 7,076,523 B2 | 7/2006 | Schneider et al. |
| 7,079,807 B1 | 7/2006 | Daum et al. |
| 7,081,579 B2 | 7/2006 | Alcalde et al. |
| 7,082,106 B2 | 7/2006 | Sharma et al. |
| 7,099,296 B2 | 8/2006 | Belcea |
| 7,102,067 B2 | 9/2006 | Gang et al. |
| 7,103,643 B1 | 9/2006 | Jacobs et al. |
| 7,107,045 B1 | 9/2006 | Knoop |
| 7,109,975 B2 | 9/2006 | Fedorak et al. |
| 7,120,871 B1 | 10/2006 | Harrington |
| 7,130,608 B2 | 10/2006 | Hollstrom et al. |
| 7,130,616 B2 | 10/2006 | Janik |
| 7,133,924 B1 | 11/2006 | Rosenberg et al. |
| 7,134,040 B2 | 11/2006 | Ayres |
| 7,136,399 B1 | 11/2006 | Lanigan |
| 7,136,934 B2 | 11/2006 | Carter et al. |
| 7,139,770 B2 | 11/2006 | Nakase et al. |
| 7,143,939 B2 | 12/2006 | Henzerling |
| 7,149,983 B1 | 12/2006 | Robertson et al. |
| 7,152,110 B2 | 12/2006 | Pierce |
| 7,171,018 B2 | 1/2007 | Rhoads et al. |
| 7,171,491 B1 | 1/2007 | O'Toole et al. |
| 7,181,023 B1 | 2/2007 | Andrews |
| 7,185,054 B1 | 2/2007 | Ludwig et al. |
| 7,187,947 B1 | 3/2007 | White et al. |
| 7,188,352 B2 | 3/2007 | Nathan et al. |
| 7,194,322 B2 | 3/2007 | Kaneko et al. |
| 7,203,838 B1 | 4/2007 | Glazer et al. |
| 7,206,838 B2 | 4/2007 | Boyd et al. |
| 7,215,949 B2 | 5/2007 | Sauriol |
| 7,218,611 B2 | 5/2007 | Mimura et al. |
| 7,228,054 B2 | 6/2007 | Cowgill |
| 7,237,198 B1 | 6/2007 | Chaney et al. |
| 7,240,106 B2 | 7/2007 | Cochran et al. |
| 7,248,893 B2 | 7/2007 | Christensen et al. |
| 7,249,147 B2 | 7/2007 | Juszkiewicz |
| 7,249,367 B2 | 7/2007 | Bove, Jr. et al. |
| 7,260,638 B2 | 8/2007 | Crosbie |
| 7,269,854 B2 | 9/2007 | Simmons et al. |
| 7,277,765 B1 | 10/2007 | Beckmann et al. |
| 7,277,955 B2 | 10/2007 | Elliott |
| 7,281,034 B1 | 10/2007 | Eyal |
| 7,292,588 B2 | 11/2007 | Milley et al. |
| 7,293,277 B1 | 11/2007 | Nathan |
| 7,299,271 B2 | 11/2007 | Sato |
| 7,299,304 B2 | 11/2007 | Saint-Hilaire et al. |
| 7,301,900 B1 | 11/2007 | Laksono |
| 7,302,224 B2 | 11/2007 | Sibley |
| 7,308,489 B2 | 12/2007 | Weast |
| 7,325,043 B1 | 1/2008 | Rosenberg et al. |
| 7,340,768 B2 | 3/2008 | Rosenberger |
| 7,343,141 B2 | 3/2008 | Ellis et al. |
| 7,343,160 B2 | 3/2008 | Morton |
| 7,343,414 B2 | 3/2008 | Lipscomb et al. |
| 7,370,016 B1 | 5/2008 | Hunter et al. |
| 7,373,109 B2 | 5/2008 | Pohja et al. |
| 7,403,769 B2 | 7/2008 | Kopra et al. |
| 7,426,329 B2 | 9/2008 | Calhoon et al. |
| 7,428,023 B2 | 9/2008 | Allen et al. |
| 7,451,177 B1 | 11/2008 | Johnson et al. |
| 7,454,511 B2 * | 11/2008 | Weast ............... H04L 67/16 709/203 |
| 7,468,934 B1 | 12/2008 | Janik |
| 7,469,283 B2 | 12/2008 | Eyal et al. |
| 7,472,353 B1 | 12/2008 | Wolff et al. |
| 7,483,958 B1 | 1/2009 | Elabbady et al. |
| 7,490,171 B2 | 2/2009 | Saint-Hilaire et al. |
| 7,496,665 B2 | 2/2009 | Karaoguz et al. |
| 7,503,059 B1 | 3/2009 | Rothschild |
| 7,512,685 B2 | 3/2009 | Lunsford |
| 7,512,702 B1 | 3/2009 | Srivastava et al. |
| 7,516,212 B2 | 4/2009 | Nguyen et al. |
| 7,525,289 B2 | 4/2009 | Janik et al. |
| 7,535,465 B2 | 5/2009 | Morse et al. |
| 7,555,543 B2 | 6/2009 | Encarnacion et al. |
| 7,567,987 B2 | 7/2009 | Shappell |
| 7,571,014 B1 | 8/2009 | Lambourne et al. |
| 7,590,084 B2 | 9/2009 | Perlman |
| 7,606,872 B2 | 10/2009 | Stevenson et al. |
| 7,627,343 B2 | 12/2009 | Fadell et al. |
| 7,643,894 B2 | 1/2010 | Braithwaite et al. |
| 7,647,385 B2 | 1/2010 | Encarnacion et al. |
| 7,652,844 B2 | 1/2010 | Edwards et al. |
| 7,660,601 B2 | 2/2010 | Janik et al. |
| 7,668,939 B2 * | 2/2010 | Encarnacion ....... H04L 12/2803 709/220 |
| 7,688,803 B1 | 3/2010 | Young et al. |
| 7,693,992 B2 | 4/2010 | Watson |
| 7,698,723 B2 | 4/2010 | Hicks |
| 7,702,363 B2 | 4/2010 | Cao |
| 7,702,403 B1 | 4/2010 | Gladwin et al. |
| 7,711,838 B1 | 5/2010 | Boulter et al. |
| 7,712,125 B2 | 5/2010 | Herigstad et al. |
| 7,734,688 B2 | 6/2010 | Langdon |
| 7,739,335 B2 | 6/2010 | Siegel et al. |
| 7,742,606 B2 | 6/2010 | Kreifeldt et al. |
| 7,768,234 B2 | 8/2010 | Janik et al. |
| 7,783,722 B1 | 8/2010 | Rosenberg et al. |
| 7,786,705 B2 | 8/2010 | Janik et al. |
| 7,797,272 B2 | 9/2010 | Picker et al. |
| 7,802,278 B2 | 9/2010 | Kweon |
| 7,827,110 B1 | 11/2010 | Wieder |
| 7,827,236 B2 | 11/2010 | Ferris |
| 7,827,581 B1 | 11/2010 | Eiger |
| 7,840,691 B1 | 11/2010 | De Bonet et al. |
| 7,856,485 B2 | 12/2010 | Prager et al. |
| 7,870,088 B1 | 1/2011 | Chen et al. |
| 7,890,661 B2 | 2/2011 | Spurgat et al. |
| 7,899,915 B2 | 3/2011 | Reisman |
| 7,904,579 B2 | 3/2011 | Janik et al. |
| 7,917,557 B2 | 3/2011 | Shteyn et al. |
| 7,917,645 B2 | 3/2011 | Ikezoye et al. |
| 7,920,824 B2 | 4/2011 | Janik et al. |
| 7,926,085 B2 | 4/2011 | Del Beccaro et al. |
| 7,928,310 B2 | 4/2011 | Georges et al. |
| 7,996,873 B1 | 8/2011 | Nathan et al. |
| 8,005,724 B2 | 8/2011 | Dunning et al. |
| 8,014,423 B2 | 9/2011 | Thaler et al. |
| 8,023,998 B2 | 9/2011 | Croome |
| 8,024,419 B2 | 9/2011 | Gudorf |
| 8,028,093 B2 | 9/2011 | Karaoguz et al. |
| 8,028,323 B2 | 9/2011 | Weel |

(56) References Cited

U.S. PATENT DOCUMENTS

| | | |
|---|---|---|
| 8,036,265 B1 | 10/2011 | Reynolds et al. |
| 8,045,952 B2 | 10/2011 | Qureshey et al. |
| 8,050,652 B2 | 11/2011 | Qureshey et al. |
| 8,082,355 B1 | 12/2011 | Weber et al. |
| 8,086,287 B2 | 12/2011 | Mooney |
| 8,135,796 B1 | 3/2012 | Abdelaziz et al. |
| 8,160,495 B2 | 4/2012 | Khedouri et al. |
| 8,214,873 B2 | 7/2012 | Weel |
| 8,281,001 B2 | 10/2012 | Busam et al. |
| 8,359,351 B2 | 1/2013 | Istvan et al. |
| 8,381,252 B2 | 2/2013 | Young |
| 8,433,240 B2 | 4/2013 | Slotznick |
| 8,832,746 B2 | 9/2014 | Pack et al. |
| 8,918,480 B2 | 12/2014 | Qureshey et al. |
| 2001/0005368 A1 | 6/2001 | Rune |
| 2001/0025259 A1 | 9/2001 | Rouchon |
| 2001/0034763 A1 | 10/2001 | Jacobs et al. |
| 2001/0039659 A1 | 11/2001 | Simmons et al. |
| 2001/0042107 A1 | 11/2001 | Palm |
| 2001/0042109 A1 | 11/2001 | Bolas et al. |
| 2001/0044321 A1 | 11/2001 | Ausems et al. |
| 2001/0051852 A1 | 12/2001 | Sundaravel et al. |
| 2001/0053994 A1 | 12/2001 | Atcheson et al. |
| 2001/0054060 A1 | 12/2001 | Fillebrown |
| 2002/0002039 A1 | 1/2002 | Qureshey et al. |
| 2002/0007418 A1 | 1/2002 | Hegde et al. |
| 2002/0010759 A1 | 1/2002 | Hitson et al. |
| 2002/0013852 A1 | 1/2002 | Janik |
| 2002/0022453 A1 | 2/2002 | Balog et al. |
| 2002/0023270 A1 | 2/2002 | Thomas et al. |
| 2002/0026442 A1 | 2/2002 | Lipscomb |
| 2002/0032019 A1 | 3/2002 | Marks et al. |
| 2002/0035616 A1 | 3/2002 | Diamond et al. |
| 2002/0040255 A1 | 4/2002 | Neoh |
| 2002/0042915 A1 | 4/2002 | Kubischta et al. |
| 2002/0048224 A1 | 4/2002 | Dygert et al. |
| 2002/0049037 A1 | 4/2002 | Christensen et al. |
| 2002/0049760 A1 | 4/2002 | Scott et al. |
| 2002/0053078 A1 | 5/2002 | Holtz et al. |
| 2002/0065902 A1 | 5/2002 | Janik et al. |
| 2002/0068558 A1 | 6/2002 | Janik |
| 2002/0072326 A1 | 6/2002 | Qureshey et al. |
| 2002/0073204 A1 | 6/2002 | Dutta et al. |
| 2002/0080719 A1 | 6/2002 | Parkvall et al. |
| 2002/0083148 A1 | 6/2002 | Shaw et al. |
| 2002/0087996 A1* | 7/2002 | Bi .................. G06F 1/1613 725/89 |
| 2002/0116082 A1 | 8/2002 | Gudorf |
| 2002/0122410 A1 | 9/2002 | Kulikov |
| 2002/0123276 A1 | 9/2002 | Peetz |
| 2002/0138630 A1 | 9/2002 | Solomon et al. |
| 2002/0144259 A1 | 10/2002 | Gutta et al. |
| 2002/0147782 A1 | 10/2002 | Dimitrova et al. |
| 2002/0161858 A1 | 10/2002 | Goldman |
| 2002/0165912 A1 | 11/2002 | Wenocur et al. |
| 2002/0166123 A1 | 11/2002 | Schrader et al. |
| 2002/0168938 A1 | 11/2002 | Chang |
| 2002/0170062 A1 | 11/2002 | Chen et al. |
| 2002/0173273 A1 | 11/2002 | Spurgat et al. |
| 2002/0173339 A1 | 11/2002 | Safadi |
| 2002/0174243 A1 | 11/2002 | Spurgat et al. |
| 2002/0174426 A1 | 11/2002 | Gutta et al. |
| 2002/0183059 A1 | 12/2002 | Noreen et al. |
| 2002/0184635 A1 | 12/2002 | Istvan |
| 2002/0194260 A1 | 12/2002 | Headley et al. |
| 2002/0194619 A1 | 12/2002 | Chang et al. |
| 2002/0199001 A1 | 12/2002 | Wenocur et al. |
| 2003/0014750 A1 | 1/2003 | Kamen |
| 2003/0014759 A1 | 1/2003 | Van Stam |
| 2003/0022675 A1 | 1/2003 | Mergler |
| 2003/0023427 A1 | 1/2003 | Cassin et al. |
| 2003/0041110 A1 | 2/2003 | Wenocur et al. |
| 2003/0045955 A1 | 3/2003 | Janik |
| 2003/0050062 A1 | 3/2003 | Chen et al. |
| 2003/0058805 A1 | 3/2003 | Meyerson |
| 2003/0060157 A1 | 3/2003 | Henrick |
| 2003/0080874 A1 | 5/2003 | Yumoto et al. |
| 2003/0088479 A1 | 5/2003 | Wooten et al. |
| 2003/0093790 A1 | 5/2003 | Logan et al. |
| 2003/0093797 A1 | 5/2003 | Bazzaz |
| 2003/0103627 A1 | 6/2003 | Nierzwick et al. |
| 2003/0103644 A1 | 6/2003 | Klayh |
| 2003/0115351 A1 | 6/2003 | Giobbi |
| 2003/0126211 A1 | 7/2003 | Anttila et al. |
| 2003/0126239 A1 | 7/2003 | Hwang |
| 2003/0126293 A1 | 7/2003 | Bushey |
| 2003/0130009 A1 | 7/2003 | Kung |
| 2003/0137531 A1 | 7/2003 | Katinsky et al. |
| 2003/0140343 A1 | 7/2003 | Falvo et al. |
| 2003/0147624 A1 | 8/2003 | Trajkovic et al. |
| 2003/0165128 A1 | 9/2003 | Sisodia |
| 2003/0177503 A1 | 9/2003 | Sull et al. |
| 2003/0182315 A1 | 9/2003 | Plastina et al. |
| 2003/0204439 A1 | 10/2003 | Cullen, III |
| 2003/0217102 A1 | 11/2003 | Jystad et al. |
| 2003/0225834 A1 | 12/2003 | Lee et al. |
| 2003/0227478 A1 | 12/2003 | Chatfield |
| 2003/0229549 A1 | 12/2003 | Wolinsky et al. |
| 2003/0229900 A1 | 12/2003 | Reisman |
| 2003/0236843 A1 | 12/2003 | Weber et al. |
| 2004/0002938 A1 | 1/2004 | Deguchi |
| 2004/0006634 A1 | 1/2004 | Ferris |
| 2004/0010798 A1 | 1/2004 | Galli et al. |
| 2004/0015401 A1 | 1/2004 | Lee et al. |
| 2004/0019497 A1 | 1/2004 | Volk et al. |
| 2004/0024912 A1 | 2/2004 | Fukao et al. |
| 2004/0030929 A1 | 2/2004 | Bi et al. |
| 2004/0031058 A1 | 2/2004 | Reisman |
| 2004/0055014 A1 | 3/2004 | Edelson |
| 2004/0057348 A1 | 3/2004 | Shteyn et al. |
| 2004/0078382 A1 | 4/2004 | Mercer et al. |
| 2004/0086120 A1 | 5/2004 | Akins, III et al. |
| 2004/0090984 A1 | 5/2004 | Saint-Hilaire et al. |
| 2004/0103280 A1 | 5/2004 | Balfanz et al. |
| 2004/0107219 A1 | 6/2004 | Rosenberger |
| 2004/0107242 A1 | 6/2004 | Vert et al. |
| 2004/0119894 A1 | 6/2004 | Higgins et al. |
| 2004/0121723 A1 | 6/2004 | Poltorak |
| 2004/0133914 A1 | 7/2004 | Smith et al. |
| 2004/0148393 A1 | 7/2004 | Breiter et al. |
| 2004/0160307 A1 | 8/2004 | Saikkonen et al. |
| 2004/0162830 A1 | 8/2004 | Shirwadkar et al. |
| 2004/0174863 A1 | 9/2004 | Caspi et al. |
| 2004/0181604 A1 | 9/2004 | Immonen |
| 2004/0186733 A1 | 9/2004 | Loomis et al. |
| 2004/0186887 A1 | 9/2004 | Galli et al. |
| 2004/0199494 A1 | 10/2004 | Bhatt |
| 2004/0205028 A1 | 10/2004 | Verosub et al. |
| 2004/0225519 A1 | 11/2004 | Martin |
| 2004/0225746 A1 | 11/2004 | Niell et al. |
| 2004/0246372 A1 | 12/2004 | Megeid |
| 2004/0249708 A1 | 12/2004 | Jacobs et al. |
| 2004/0255340 A1 | 12/2004 | Logan |
| 2004/0260407 A1 | 12/2004 | Wimsatt |
| 2004/0260786 A1 | 12/2004 | Barile |
| 2004/0267899 A1 | 12/2004 | Rahman et al. |
| 2004/0267965 A1 | 12/2004 | Vasudevan et al. |
| 2005/0021369 A1 | 1/2005 | Cohen et al. |
| 2005/0021470 A1 | 1/2005 | Martin et al. |
| 2005/0025320 A1 | 2/2005 | Barry |
| 2005/0033780 A1 | 2/2005 | Simelius et al. |
| 2005/0044561 A1 | 2/2005 | McDonald |
| 2005/0059379 A1 | 3/2005 | Sovio et al. |
| 2005/0060264 A1 | 3/2005 | Schrock et al. |
| 2005/0071881 A1 | 3/2005 | Deshpande |
| 2005/0091693 A1 | 4/2005 | Amine et al. |
| 2005/0113946 A9 | 5/2005 | Janik |
| 2005/0120373 A1 | 6/2005 | Thomas et al. |
| 2005/0149967 A1 | 7/2005 | Hanley et al. |
| 2005/0160270 A1 | 7/2005 | Goldberg et al. |
| 2005/0165888 A1 | 7/2005 | Elliott |
| 2005/0187976 A1 | 8/2005 | Goodman et al. |
| 2005/0196153 A1 | 9/2005 | Bullwinkel et al. |
| 2005/0198233 A1 | 9/2005 | Manchester et al. |

(56) References Cited

U.S. PATENT DOCUMENTS

| | | |
|---|---|---|
| 2005/0210507 A1 | 9/2005 | Hawkins et al. |
| 2005/0234995 A1 | 10/2005 | Plastina et al. |
| 2005/0240494 A1 | 10/2005 | Cue et al. |
| 2005/0240959 A1 | 10/2005 | Kuhn et al. |
| 2005/0245233 A1 | 11/2005 | Anderson |
| 2005/0251453 A1 | 11/2005 | Lu |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0262204 A1 | 11/2005 | Szeto et al. |
| 2005/0278380 A1 | 12/2005 | Ferris |
| 2006/0020662 A1 | 1/2006 | Robinson |
| 2006/0059260 A1 | 3/2006 | Kelly et al. |
| 2006/0072724 A1 | 4/2006 | Cohen et al. |
| 2006/0085821 A9 | 4/2006 | Simmons et al. |
| 2006/0135059 A1 | 6/2006 | Hill |
| 2006/0156346 A1 | 7/2006 | Kulakowski |
| 2006/0168264 A1 | 7/2006 | Baba et al. |
| 2006/0174348 A1 | 8/2006 | Rhoads et al. |
| 2006/0212442 A1 | 9/2006 | Conrad et al. |
| 2006/0212444 A1 | 9/2006 | Handman et al. |
| 2006/0218180 A1 | 9/2006 | Bodlaender et al. |
| 2006/0256669 A1 | 11/2006 | Sakuma et al. |
| 2006/0287746 A1 | 12/2006 | Braithwaite et al. |
| 2007/0038999 A1 | 2/2007 | Millington |
| 2007/0078660 A1 | 4/2007 | Ferris |
| 2007/0088804 A1 | 4/2007 | Qureshey et al. |
| 2007/0089132 A1 | 4/2007 | Qureshey et al. |
| 2007/0089135 A1 | 4/2007 | Qureshey et al. |
| 2007/0180063 A1 | 8/2007 | Qureshey et al. |
| 2007/0247979 A1 | 10/2007 | Brillon et al. |
| 2008/0033821 A1 | 2/2008 | Jacobi et al. |
| 2008/0109095 A1 | 5/2008 | Braithwaite et al. |
| 2008/0114481 A1 | 5/2008 | Braithwaite et al. |
| 2008/0133520 A1 | 6/2008 | Hempleman et al. |
| 2009/0077041 A1 | 3/2009 | Eyal et al. |
| 2009/0193472 A1 | 7/2009 | Braithwaite et al. |
| 2010/0172512 A1 | 7/2010 | Braithwaite et al. |
| 2011/0016483 A1 | 1/2011 | Opdycke |
| 2011/0026727 A1 | 2/2011 | Braithwaite et al. |
| 2011/0044468 A1 | 2/2011 | Braithwaite et al. |
| 2011/0044469 A1 | 2/2011 | Braithwaite et al. |
| 2011/0157476 A1 | 6/2011 | Arling et al. |
| 2012/0042007 A1 | 2/2012 | Weel |
| 2012/0042094 A1 | 2/2012 | Qureshey et al. |
| 2012/0042337 A1 | 2/2012 | De Bonet et al. |
| 2012/0143729 A1 | 6/2012 | Qureshey et al. |

FOREIGN PATENT DOCUMENTS

| | | |
|---|---|---|
| EP | 0663737 | 7/1995 |
| EP | 0789502 | 8/1997 |
| EP | 984584 | 3/2000 |
| JP | 09-081164 | 3/1997 |
| JP | 2000-148169 | 5/2000 |
| JP | 2001-222288 | 8/2001 |
| JP | 2002-006868 | 1/2002 |
| JP | 2002-082679 | 3/2002 |
| WO | WO 96/17451 | 6/1996 |
| WO | WO 97/26601 | 7/1997 |
| WO | WO 97/44747 | 11/1997 |
| WO | WO 98/21891 | 5/1998 |
| WO | WO 99/18518 | 4/1999 |
| WO | WO 99/38266 | 7/1999 |
| WO | WO 99/43111 | 8/1999 |
| WO | WO 99/57646 | 11/1999 |
| WO | WO 00/52935 | 9/2000 |
| WO | WO 01/36064 | 5/2001 |
| WO | WO 01/53994 | 7/2001 |
| WO | WO 01/61894 | 8/2001 |
| WO | WO 02/21841 | 3/2002 |
| WO | WO 2004/027606 | 4/2004 |

\* cited by examiner

US 9,516,370 B1

METHOD, DEVICE, AND SYSTEM FOR DIRECTING A WIRELESS SPEAKER FROM A MOBILE PHONE TO RECEIVE AND RENDER A PLAYLIST FROM A CONTENT SERVER ON THE INTERNET

CROSS-REFERENCE TO RELATED APPLICATIONS

This application is a continuation of co-pending U.S. patent application Ser. No. 13/539,923, filed on Jul. 2, 2012, entitled "METHOD, SYSTEM, AND COMPUTER-READABLE MEDIUM FOR EMPLOYING A FIRST DEVICE TO DIRECT A NETWORKED AUDIO DEVICE TO RENDER A PLAYLIST," which is a continuation of U.S. patent application Ser. No. 13/207,113, filed on Aug. 10, 2011, entitled "METHOD, SYSTEM, AND COMPUTER-READABLE MEDIUM FOR EMPLOYING A FIRST DEVICE TO DIRECT A NETWORKED AUDIO DEVICE TO RENDER A PLAYLIST," now U.S. Pat. No. 8,214,873, which is a continuation of U.S. patent application Ser. No. 10/840,109, filed May 5, 2004, entitled "METHOD AND SYSTEM FOR EMPLOYING A FIRST DEVICE TO DIRECT A NETWORKED AUDIO DEVICE TO OBTAIN A MEDIA ITEM," now U.S. Pat. No. 8,028,323, each of which is hereby incorporated herein by reference in its entirety.

FIELD OF THE DISCLOSURE

The present invention relates generally to a method and system for playing music. The present invention relates more particularly to a digital entertainment network wherein playlists are obtained by communicating attributes of the playlists to a playlist server and wherein songs are obtained by communicating information representative of the songs to a content server.

BACKGROUND

Traditionally, music has been provided to listeners by either a broadcast method or a purchase method. According to the broadcast method, music is broadcast to listeners by such means as radio and cable systems. The owners of the music are typically compensated by the broadcaster via either the American Society of Composers, Authors and Publishers (ASCAP) or Broadcast Music Incorporated (BMI). These two agencies monitor the playing of music by broadcasters, collect royalties from the broadcasters, and distribute the royalties to the copyright owners of the music.

However, according to the broadcast method the listener has little or no control over which selections are played. Generally, a listener must tune in to a radio station or select a cable channel that plays the type of music that the listener enjoys with the expectation that songs that the listener enjoys will occasionally be played. Too frequently, these songs are not played as often as the listener would prefer.

According to the purchase method, a listener purchases prerecorded music stored on media such as compact discs (COs). The listener may then play the songs as many times as desired. Copyright owners are paid royalties out of the purchase price of the music.

However, the purchase method requires that a substantial price be paid for the music, at least in part because of the virtually unlimited 4se associated therewith. Listeners appear to be becoming less willing to pay the purchase price for such prerecorded music, particularly as alternative methods for obtaining music become more popular.

The purchase method suffers from the additional disadvantage of requiring that media containing the desired songs be utilized. Such media is somewhat bulky, particularly when a large number of selections are desired. In some instances, it may not be practical to carry all of the songs desired because of the volume and/or weight of the media required. Such media is also undesirably subject to degradation due to use and mishandling. For example, scratches on a CD may inhibit its use.

A newer method of providing music to listeners is becoming increasingly popular. It is this method of providing music that is apparently making listeners less willing to pay the purchase price for music that is prerecorded on media. According to this newer method of providing music, the music is downloaded from the Internet or otherwise obtained {such as by trading with friends}, as a data file. One popular example of such a data file is an MP3 file. MP3 is short for Moving Picture Experts Group 1, audio layer 3.

Although music embodied in data files can be obtained legitimately, such as via such services like iTunes (a trademark of Apple Computer, Inc.), the opportunity to download or trade music data files for free has heretofore hampered this legitimate method of obtaining music.

As such, although the prior art has recognized, to a limited extent, the problem of distributing music, the proposed solutions have, to date, been ineffective in providing a satisfactory remedy. Therefore, it is desirable to provide a method for distributing music that is convenient, does not involve the use of media, and which provides for the payment of royalties.

SUMMARY

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

In an embodiment, a mobile phone for facilitating a presentation of media comprises a display for displaying, on a touchscreen of the mobile phone, a plurality of device identifiers for a plurality of devices and a network transceiver for facilitating communication between the mobile phone, a content server, and at least one of the plurality of devices on a network, the network transceiver operably in communication with the display. The mobile phone is configured to facilitate: receiving user first input identifying one of the plurality of device identifiers that is for a rendering device on the network; providing information identifying a user of the mobile phone to the content server; requesting a playlist comprising a plurality of media item identifiers, the playlist based on the information identifying the user of the mobile phone; receiving the playlist; receiving, at the mobile phone, user second input identifying at least one media item identifier from the playlist; and directing, from the mobile phone, the rendering device to obtain a media item identified by the at least one media item identifier from the content server and to play the media item, the media item obtained without user input at the rendering device. The mobile phone and the rendering device are connected to the content server through the Internet, and the mobile phone is connected to the rendering device through a LAN over Wi-Fi using TCP/IP.

As used herein, the term network transceiver includes any circuit or device that facilitates communication via a network. Examples of network transceivers include Ethernet network interface cards (NICs) and circuits, as well as Bluetooth and Wi-Fi cards and circuits.

In an embodiment• a mobile phone for facilitating a presentation of media comprises a display for displaying, on a touchscreen of the mobile phone, a plurality of device identifiers of a plurality of devices; and a network transceiver for facilitating communication between the mobile phone, a content server, and at least one of the plurality of devices on a network, the network transceiver operably in communication with the display. The mobile phone is configured to facilitate: receiving user first input identifying one of the plurality of device identifiers, wherein the one of the plurality of device identifiers identifies a rendering device; providing information identifying a user of the mobile phone; receiving a message based on the information identifying the user of the mobile phone, the message comprising information identifying a playlist comprising a plurality of media item identifiers; receiving, at the mobile phone, user second input identifying at least one media item identifier from the playlist; and directing, from the mobile phone, the rendering device to obtain a media item identified by the at least one media item identifier from a content server and to play the media item, the media item obtained without user input at the rendering device. The mobile phone and the rendering device are connected to the content server through the Internet, and the mobile phone is connected to the rendering device through a LAN over Wi-Fi using TCP/IP.

In an embodiment, a computer implemented method of facilitating a presentation of media is provided. The method comprises displaying, on a touchscreen of a mobile phone, a plurality of device identifiers. The method further comprises receiving user first input identifying one of the plurality of device identifiers, wherein the one of the plurality of device identifiers identifies a rendering device, wherein the rendering device is one of a standalone wireless speaker, a television, and a stereo. The method further comprises providing information identifying a user of the mobile phone to a content server via the Internet. The method further comprises requesting a playlist based on the information identifying the user of the mobile phone, the playlist comprising a plurality of media item identifiers corresponding to media items ordered to be played in an arranged sequence. The method further comprises receiving the playlist. The method further comprises receiving, at the mobile phone, user second input identifying at least one media item identifier from the playlist. The method further comprises directing the rendering device, from the mobile phone via a LAN over Wi-Fi using TCP/IP, to obtain a media item identified by the at least one media item identifier from the content server, via the Internet, and to play the media item, the media item obtained without user input at the rendering device.

In an embodiment, a method of facilitating a presentation of media is provided. The method comprises displaying, on a touchscreen of a mobile phone, a plurality of device identifiers. The method further comprises receiving user first input identifying one of the plurality of device identifiers, wherein the one of the plurality of device identifiers identifies a rendering device, wherein the rendering device is one of a standalone wireless speaker, a television, and a stereo. The method further comprises providing information identifying a user of the mobile phone to a content server via the Internet. The method further comprises receiving a message based on the information identifying the user of the mobile phone, the message comprising information identifying a playlist, the playlist comprising a plurality of media item identifiers corresponding to media items ordered to be played in an arranged sequence. The method further comprises receiving, at the mobile phone, user second input identifying at least one media item identifier from the playlist. The method further comprises directing the rendering device, from the mobile phone via a LAN over Wi-Fi using TCP/IP, to obtain a media item identified by the at least one media item identifier from a content server via the Internet and to play the media item, the media item obtained without user input at the rendering device.

In an embodiment, provided is a non-transitory computer readable medium embodied in an article of manufacture and storing software adapted to execute on a controller to display, on a touchscreen of a mobile phone, a plurality of device identifiers. The software is further adapted to receive user first input identifying one of the plurality of device identifiers, wherein the one of the plurality of device identifiers identifies a rendering device, wherein the rendering device is one of a standalone wireless speaker, a television, and a stereo. The software is further adapted to provide information identifying a user of the mobile phone to a content server via the Internet. The software is further adapted to request a playlist based on the information identifying the user of the mobile phone. The software is further adapted to receive the playlist, the playlist comprising a plurality of media item identifiers corresponding to media items ordered to be played in an arranged sequence. The software is further adapted to receive, at the mobile phone, user second input identifying at least one media item identifier from the playlist. The software is further adapted to direct the rendering device, from the mobile phone via a LAN over Wi-Fi using TCP/IP, to obtain a media item identified by the at least one media item identifier from a content server via the Internet and to play the media item, the media item obtained without user input at the rendering device.

In an embodiment, provided is a non-transitory computer readable medium storing software for instructing a controller of a mobile phone to display, on a touchscreen of a mobile phone, a plurality of device identifiers. The controller is further constructed to receive user first input identifying one of the plurality of device identifiers, wherein the one of the plurality of device identifiers identifies the rendering device, wherein the rendering device is one of a standalone wireless speaker, a television, and a stereo. The controller is further constructed to provide information identifying a user of the mobile phone to a content server via the Internet. The controller is further constructed to receive a message based on the information identifying the user of the mobile phone, the message comprising information identifying a playlist, the playlist comprising a plurality of media item identifiers corresponding to media items ordered to be played in an arranged sequence. The controller is further constructed to receive, at the mobile phone, user second input identifying at least one media item identifier from the playlist. The controller is further constructed to direct the rendering device, from the mobile phone via a LAN over Wi-Fi using TCP/IP, to obtain a media item identified by the at least one media item identifier from a content server via the Internet and to play the media item, the media item obtained without user input at the rendering device.

In an embodiment, a system comprises a content server, a mobile phone, and a rendering device. The content server, the mobile phone, and the rendering device are all separate devices. The mobile phone and the rendering device are connected to the content server through the Internet, and the mobile phone is connected to the rendering device through a LAN over Wi-Fi using TCP/IP. The content server comprises a first network transceiver for facilitating communication between the content server, a mobile phone, and a rendering device.

The content server of the system is configured to: receive, from the mobile phone, a request for a playlist; and provide, to the mobile phone, the playlist. The mobile phone comprises a second network transceiver for facilitating communication between the mobile phone, the content server, and the rendering device.

The mobile phone of the system is configured to: display, on a touchscreen of the mobile phone, a plurality of device identifiers; receive user first input identifying one of the plurality of device identifiers, wherein the one of the plurality of device identifiers identifies the rendering device; request a playlist based on information identifying a user of the mobile phone, the playlist comprising a plurality of media item identifiers; receive the playlist; receive, at the mobile phone, user second input identifying at least one media item identifier from the playlist; and direct, from the mobile phone, the rendering device to obtain a media item identified by the at least one media item identifier from the content server and to play the media item, the media item obtained without user input at the rendering device.

The rendering device of the system comprises a third network transceiver for facilitating communication between the rendering device, the content server, and the mobile phone, wherein the rendering device is configured to: provide, to the mobile phone, the device identifier for the rendering device; receive, from the mobile phone, the playlist, the playlist comprising a plurality of media item identifiers; obtain, from the content server, at least one media item indicated by a media item identifier of the plurality of media item identifiers comprising the playlist; and render the at least one media item.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION

Figure 1:
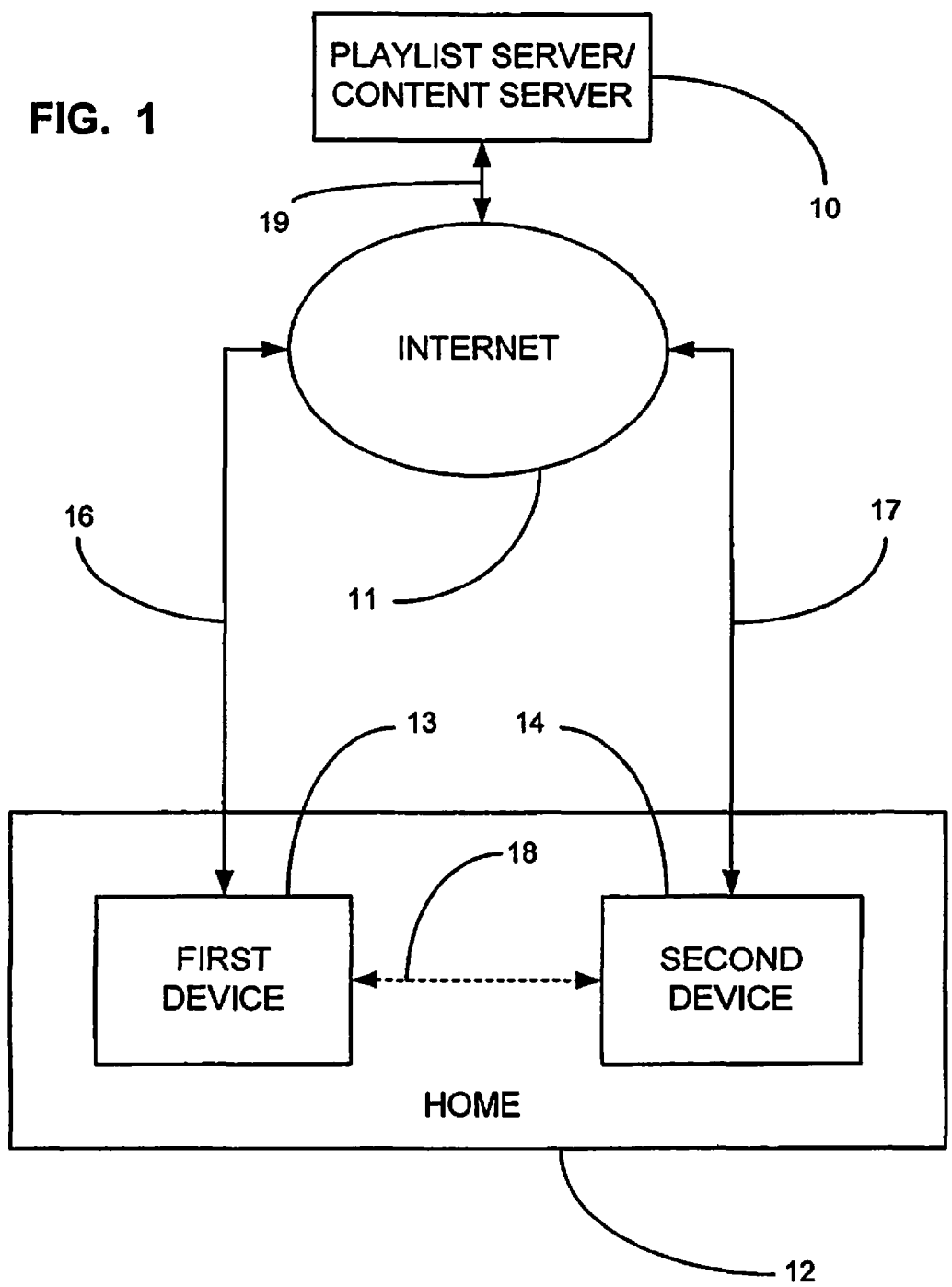
FIG. 1 is a block diagram showing an exemplary embodiment of the digital entertainment system of the present invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense •of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments• that are also intended to be encompassed within the spirit of the invention.

The digital entertainment network of the present invention is preferably a fully integrated plug and play technology platform that delivers secure anytime, anywhere, on-demand multimedia content for digital home systems.

The digital entertainment network provides efficient and ubiquitous wireless and web-enabled control over digital home systems by enabling users to access and manage music content using a variety of control devices and by delivering such content to a wide variety of different rendering devices.

On-demand delivery of content, such as streaming music, is provided utilizing such user-friendly features such as customized playlists, collaboration, music management tools, and search capability.

The present invention preferably provides a plug and play control point that has the software intelligence that forms the basis for a truly integrated entertainment network system. This control point architecture delivers the ability to unify content, such as music or other types of multimedia content, with control applications that enable system users to access content from a variety of different remote control devices and deliver such content to a variety of rendering devices.

For example, the control point enables a digital entertainment network user to utilize a PDA or other device to browse for music on the Internet, then select and play a song on an MP3 player or the like or even on stand-alone audio speakers. In another embodiment, the control point allows a user to choose a song via a set-top device, then play that music on a television, stereo system, or the like.

Preferably, the present invention comprises a web services based component that provides users with on-demand music streamed to a variety of devices, such as MP3 players, set-top boxes and home stereo systems. Thus, according to one aspect, the present inventi9h is a web-based content and music management system that offers users a number of desirable features via a web browser.

These features preferably include web-based music catalog browsing via jukebox interface, • search capability (to find artists and specific selections), the use of standard playlists, the use of custom playlists (created by each user), the ability to select different devices on which to play songs, the ability to view a user's activity over a given time period or in real-time with the activity streamer, collaboration, the ability to find buddies with the same music preferences you have in your playlist the ability to share playlists with buddies, the ability to view buddies' activity based on various time periods, instant messaging for chatting among users, and the use of a set top box to facilitate the use of playlists and the streaming of content.

According to one aspect, the digital entertainment network of the present invention comprises a set-top box that provides users with on-demand music streamed to a variety of devices. The set-top box is a web-based content and music management system that offers users a list of features including the need for little or no setup (plug into Ethernet and video out, audio out), content catalog browsing, search capability (to find artists and specific selections), the use of standard playlists, the use of custom playlists (created by each user), the ability to select different devices on which to play songs, the ability to view your activity over a given time period or ih real-time with the activity streamer collaboration, the ability to find buddies with the same music preferences you have in your playlists, the ability to share playlists with buddies, the ability to view buddies' activity based on various time periods, and instant messaging for chatting among users.

The digital entertainment network of the present invention comprises control devices that allow users to communicate with the control point and •give commands to render music/multimedia content on various different rendering devices. Examples of control devices include the personal digital assistant (POAs) and set-top boxes.

According to one aspect of the present invention, a PDA based control application allows users to roam the house and play music content that is accessed via the PDA and is available via an Internet based service. According to one aspect, the content is played via set-top boxes, i.e., rendering devices, which may be located throughout the home.

The digital entertainment network also includes rendering devices that receive instructions from the control point and thereby render music/multimedia content. Rendering device examples include the set-top devices, home stereo systems and televisions. A variety of different types of rendering devices are possible. Audio content, such as music may be rendered on audio rendering devices such as speakers, a stereo, and a television. Similarly, audio/video content, such as movies and television shows, may be rendered on televisions, stand-alone monitors, and computer monitors. Indeed, either audio or audio/video content may be rendered on a variety of other types of devices, such as cellular telephones, PDAs, and laptop computers.

According to one aspect of the present invention, a set-top device is a key rendering device that plays music content on other rendering devices, such as televisions and stereo systems, throughout the home.

The digital entertainment network of the present invention optionally comprises a billing application for handling the financial transaction activities associated with streaming content payment and usage. The billing application preferably performs functions such as transaction and usage Jogging for billing processing, automated billing of customers, automated notification of the inability to charge a credit card on file (exception handling), and automated calculation and wire transfer of funds to content providers.

The present invention is illustrated in FIGS. 1-8, which depict presently preferred embodiments thereof.

Referring now to FIG. 1, a preferred embodiment of the present invention comprises a playlist server/content server 10 that is in communication with a network preferably a wide area network such as the Internet 11. Also in communication with the network are a first device 13 and a second device 14, which are both typically located within a common structure, such as a home or office 12. • The first device 13 generally assumes the function of the control point, although the second device 14 may have this functionality, as well.

The playlist server/content server 10 may be a single server. Alternatively, the playlist server and the content server may be two separate servers. Indeed, the playlist server may comprise a plurality of separate servers and/or the content server may similarly comprise a plurality of different servers.

The playlist server/content server is in bi-directional communication with the Internet 11, as indicated by arrow 19. The first device 13 is in bi-directional communication with the Internet 11, as indicated by arrow 16. The second device 14 is in bi-directional communication with the Internet 11, as indicated by arrow 17. The first device is in communication with the second device, as indicated by arrow 18. The first device may be in either unidirectional or bi-directional communication with the second device 14.

The first device 13 may comprise any of a plurality of different types of devices. For example, the first device 13 may comprise a handheld portable device such as a personal digital assistant (PDA), a palmtop computer, an MP3 player, a telephone, or a remote control for a music rendering device. The first device may alternatively comprise a non-portable device, such as a desktop computer, a television, or a stereo.

The second device 14 may comprise the same type of device as the first device 14 or may alternatively comprise a different type of device with respect thereto. Thus, the first and second devices may comprise portable devices, non-portable devices, or any combination thereof.

The second device may also comprise one or more smart speakers. As defined herein, standalone smart speakers are speakers that are not connected to a device such as a stereo, television, or computer. Smart speakers are typically in communication with a network and can thus receive content therefrom. Typically, smart speakers comprise dedicated signal conditioning circuitry such as audio amplifiers.

According to one embodiment of the present invention, the first device 13 comprises a remote control for the second device 14. Thus, the second device may comprise a music rendering device such as a stereo, a television, or a home computer and the first device may comprise a handheld remote control therefor.

Any desired number of first and second devices may be provided according to the present invention. For example, the first device may comprise a remote control that controls a plurality of second devices, such as a television, a DVD player, and a stereo system.

Figure 2:
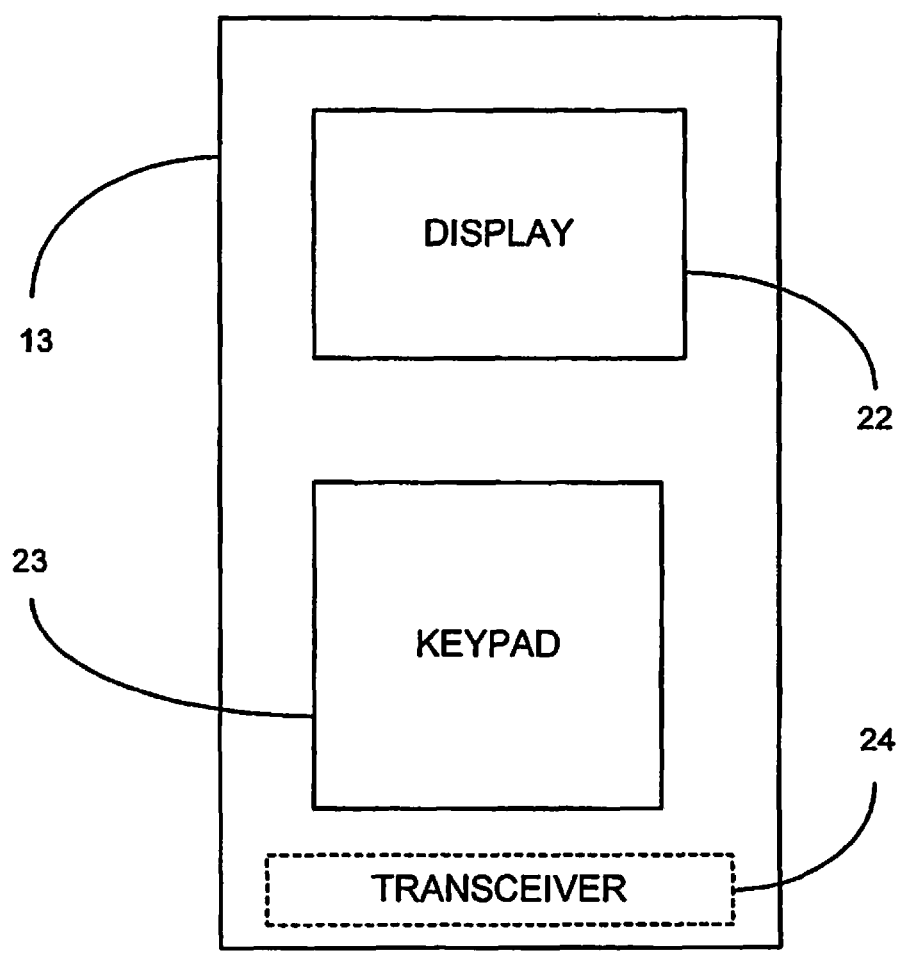
FIG. 2 is a block diagram showing further detail of an exemplary first device or remote control of FIG. 1.

Referring now to FIG. 2, the first device 13 may comprise a handheld portable device that comprises a display 22, a keypad 23, and a network transceiver 24. The display 22 facilitates viewing and selection of playlist names, as well as viewing and selection of songs within a playlist, as discussed in detail below. The keypad 23 facilitates selection of playlist names and selection of songs, as also discussed in detail below.

The display 22 may optionally comprise a touchscreen display and the keypad may optionally be omitted. In this instance, all selection may be performed via the touchscreen display.

The network transceiver 24 preferably comprises a wireless network transceiver, such network transceiver conforming to the Bluetooth (a trademark of Bluetooth SIG. Inc.) standard and/or conforming to the WiFi (a trademark of the WiFi Alliance) standard. •

The device shown in FIG. 2 may also be the second device 14 according to one aspect of the present invention. However, for explanatory purposes it may sometimes be beneficial to think of the first device as a small handheld portable device such as a PDA or dedicated remote control that can function to control the second device and it may similarly sometimes be beneficial to think of the second device as a larger music rendering device such as a stereo, television, or personal computer. Of course, such embodiments of the present invention are by way of example only, and not by way of limitation.

Having described the general structures of the present invention, the general operation thereof will next be described with reference to FIGS. 3 and 4. In operation, the digital entertainment network of the present invention provides convenient access to a very large database of music without requiring that the music be stored and •kept by the listener on media such as COs 'This convenient access is provided by maintaining the database of music at a remote location, i.e., in an Internet based content server 10.

That is, the present invention generally does not attempt to store songs within the music rendering devices themselves, but rather generally downloads songs via a network, as needed. Such operation simplifies the construction and operation of the music rendering devices by eliminating the need for large storage capacities. The elimination of the need for large storage capacities results in a cost savings for manufacturing and purchasing the music rendering devices.

Downloading the music on an as-needed basis provides access to a very large database of songs that contains many more selections than can be stored on contemporary music rendering devices. Downloading the music on an as-needed basis also facilitates the payment of royalties to the music owners in a manner that is fair to both listeners and music owners.

One exception to downloading of music on an as-needed basis• according to the present invention is optionally the use of caching. Songs that are played repeatedly may be cached, so as to mitigate the need for a network connection and thus mitigate the need for the bandwidth associated therewith. The playing of cached songs can be reported via the network and royalties paid as though the song had been downloaded strictly on an as-needed basis.

Preferably, the present invention comprises a first device that may operate in two different ways. According to a first way of operation, as shown in FIG. 3 and discussed in detail below, a listener selects a song to be played from a playlist on the first device and the song is then played• on the first device. According to a second way of operation, as shown in FIG. 4 and discussed in detail below, a listener selects a song to be played from a playlist on the first device and the song is then played on another device, e.g., a second device.

Figure 3:
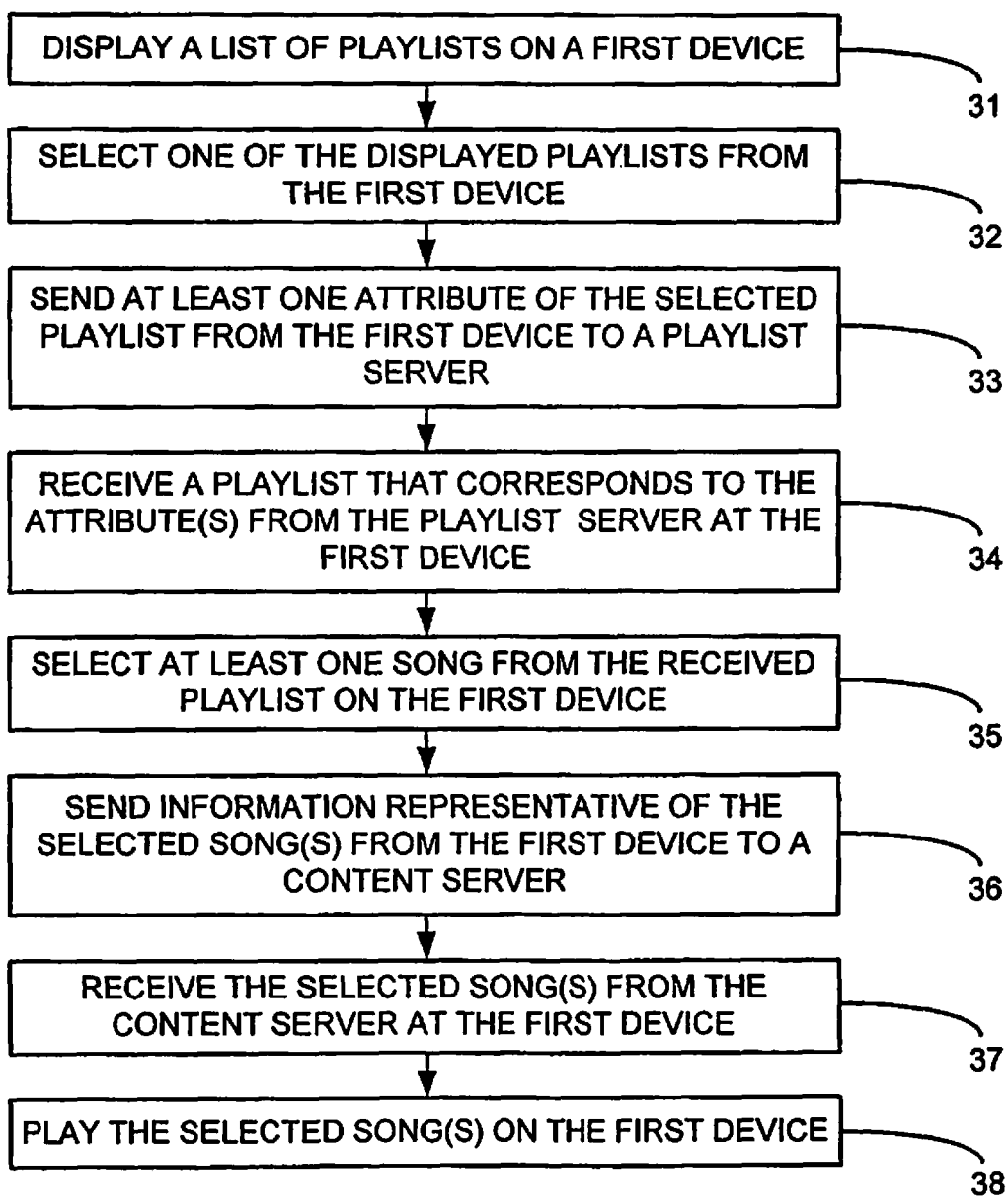
FIG. 3 is a flow chart showing one way of operating a digital entertainment system of the present invention.

Referring now to FIG. 3, the first way of operation of the first device is illustrated. A list of playlists is displayed on the first device as shown in block 31. The list of playlist is a list of playlist names, numbers, or other indicia indicative of individual playlists. For example, the list of playlists may include graphic symbols or icons in addition to or in place of other indicia. •As used herein, the term playlist name includes any indicia that are uniquely representative of a playlist.

Each item on the list of playlists is representative of a particular playlist. Each playlist may come from any one of a variety of sources. For example, a playlist may be compiled by a user, a playlist may be obtained from someone else, or a playlist may be formed by a computer using an algorithm that attempts to identify songs that will suit the tastes of the listener.

The playlists are stored on a playlist server and are downloaded to the first device and the second device as requested by the listener. As mentioned above, the playlist server may be the same server as the content server.

Optionally, playlists as well as songs may be cached on the first device and/or the second device.

The list of playlists may be displayed upon the display 22 of the first device or may be displayed in any other desired manner. For example, the list of playlists may be displayed on the• monitor of another device.

One of the displayed playlists is selected by the listener as shown in block 32. The selected playlist is a playlist that is expected to contain one or •more songs that the listener would like to listen to. For example, the displayed list of playlists may contain a playlist named rock favorites, a playlist named country favorites, and a playlist named classical favorites: If the listener wants to listen to classical music that is on the playlist named classical favorites, the playlist named classical favorites is selected.

The desired playlist may be selected by using a touch-screen display of the first device 13, may be selected using the keypad 23, or may be selected by any other desired means.

At least one attribute of the selected playlist is sent from the first device to a playlist server as shown in block 33. The attribute{s) may comprise, for example, the name of a playlist, the• number of a playlist, and/or any other unique identifier of a playlist.

Alternatively, the attribute(s} may comprise one or more parameters that are indicative of the type of music that the listener would like to hear. For example, the attribute(s) may comprise a code that indicates that a •list of the top ten country hits for the week that is to be returned. The user may preferably compile sets of such parameters so as to facilitate the retrieval of custom up to date playlists from the playlist server. Such parameters may be compil9d directly on the first device or on any other device, such as a personal computer.

A playlist that corresponds to the attribute(s) is sent from the playlist server and is received by the first device as shown in block 34. This playlist is a list of songs containing at least one song that the listener would like to hear.

The listener selects at least one song from the received playlist as shown in block 35. Either a single song may be selected, or a plurality of songs may be selected. The song{s) may be selected by using a touchscreen display of the first device 13, may be selected using the keypad, or may be selected by any other desired means.

Information representative of the selected song(s} is sent to a content server 10. The information may comprise the name(s) of the songs, the number{s) of the songs, or any other unique identifier thereof.

The selected song(s) are communicated from the content server 10 to the first device 13 via the Internet 11 as shown in block 37. The format of the selected songs may be MP3, WAV, or any other desired format.

The selected songs are played by the first device 13 as shown in block 38. The selected songs may be played in the order selected, in random order, or in any other desired order. The order can preferably be changed at any time.

The songs may be played via one or more speakers that are part of the first device 13, by one or more speakers that are in communication with the first device 13 (such as via a wired or wireless connection), by headphones, by earphones, or by any other desired means.

The volume, tone, and balance of the songs is preferably adjustable via the first device 13, such as via the display 22 and/or keypad 23 thereof.

Figure 4:
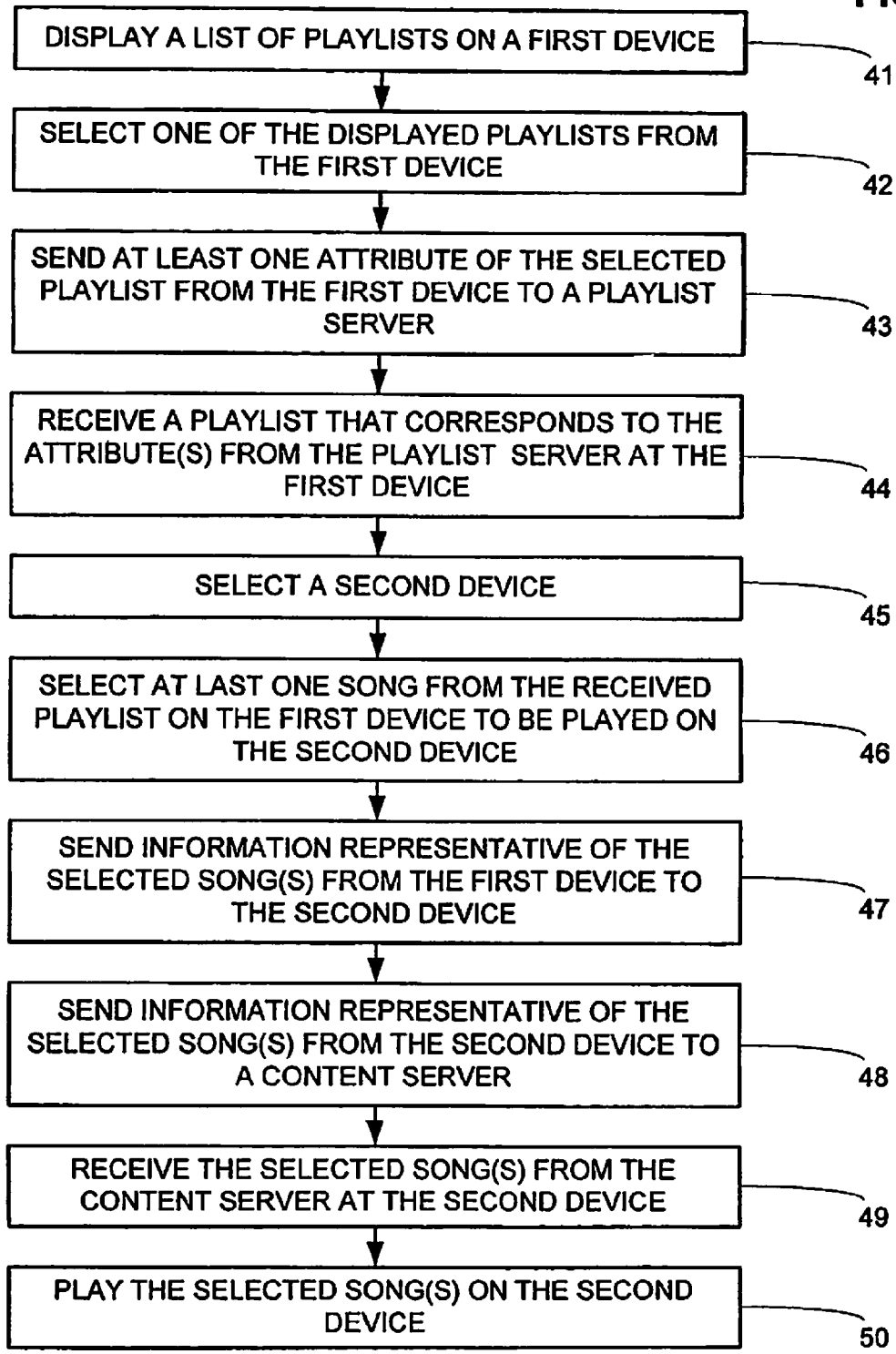
FIG. 4 is a flow chart showing another way of operating a digital entertainment system of the present invention.

Referring now •to FIG. 4, the second way of operation of the first device is •illustrated. According to this second way of operation, a list of playlists is displayed as shown in block 41, one of the playlists is selected as shown in block 42, at least one attribute is sent to the playlist server as shown in block 43, and a playlist is received as shown in block 44, all in the same fashion as in the first way of operation discussed above.

According to the second way of operation, the song is played on a device other than the first device 13. Thus, a second device 14 typically must be selected as shown in block 45. A particular second device may be selected from a list of second devices that is displayed on the first device 13. For example, a listener's desktop computer may be selected from a list having the desktop computer, a television, and a stereo listed thereon.

Preferably the list of second devices is dynamic and is automatically updated, such as via the use of a device discovery process that is described in detail below. Alternatively, the list of second devices may be pre-configured by the listener and then manually updated, as desired.

At least one song is selected from the playlist as shown in block 46 and as discussed above.

Information representative of the selected song(s) is sent from the first device 13 to the second device 14. This information tells the second device 14 what song(s) are to be played. However, the second device does not typically have the selected songs stored •therein. In some instances the selected songs may be cached within a memory of the second device 14, as discussed above.

The second device 14 sends information representative of the selected song(s) to a content server. Optionally, the second device also sends at least one attribute of the playlist from which the song(s) were selected on the first device 13 to the playlist server, as well.

The selected song(s) are received from the content server by the second device as shown in block 44 and are ready for playing. Optionally, the same playlist that is presently available for display on the first device is received from the playlist server, such that it is also available for display on the second device.

Generally, songs may be selected and played from the second device 14, as well as from the first device 13, such that it is beneficial to display the playlist on the second device 14. Even if songs cannot be selected and displayed from the second device 14, it may still be beneficial to view the playlist thereon.

The selected song is played on the second device 14 as shown in block 50 and discussed above. Parameters of the song such as volume, tone, and balance are optionally controllable from the first device 13.

Optionally, playlist and/or songs are cached in the first device 13 and/or the second device 14. Caching is particularly beneficial when the same songs and/or playlist are used repeatedly.

Although playlists and/or songs may be cached so as to mitigate the need for repeated downloading thereof from the playlist/content server 10, the memory requirements of the first device 13 and second device 14 are substantially reduced. This is •true because the first device 13 and the second device 14 of the present invention do not store a substantial quantity of playlists or songs thereon.

That is, the first device 13 and the second device 14 of the present invention do not have to store all of the songs that a listener wishes to hear thereon. Rather, any such storage is generally incidental. Typically, a large number of the songs played by the first device 13 and the second device 14 are stored on the content server 10 and are communicated via the Internet 11 to the first device 13 and/or the second device 14 as needed.

Of course, such remote storage reduces the need for memory for the first device 13 and the second device 14, thereby desirably reducing the cost- and size thereof and also enhancing the reliability thereof.

Figure 5:
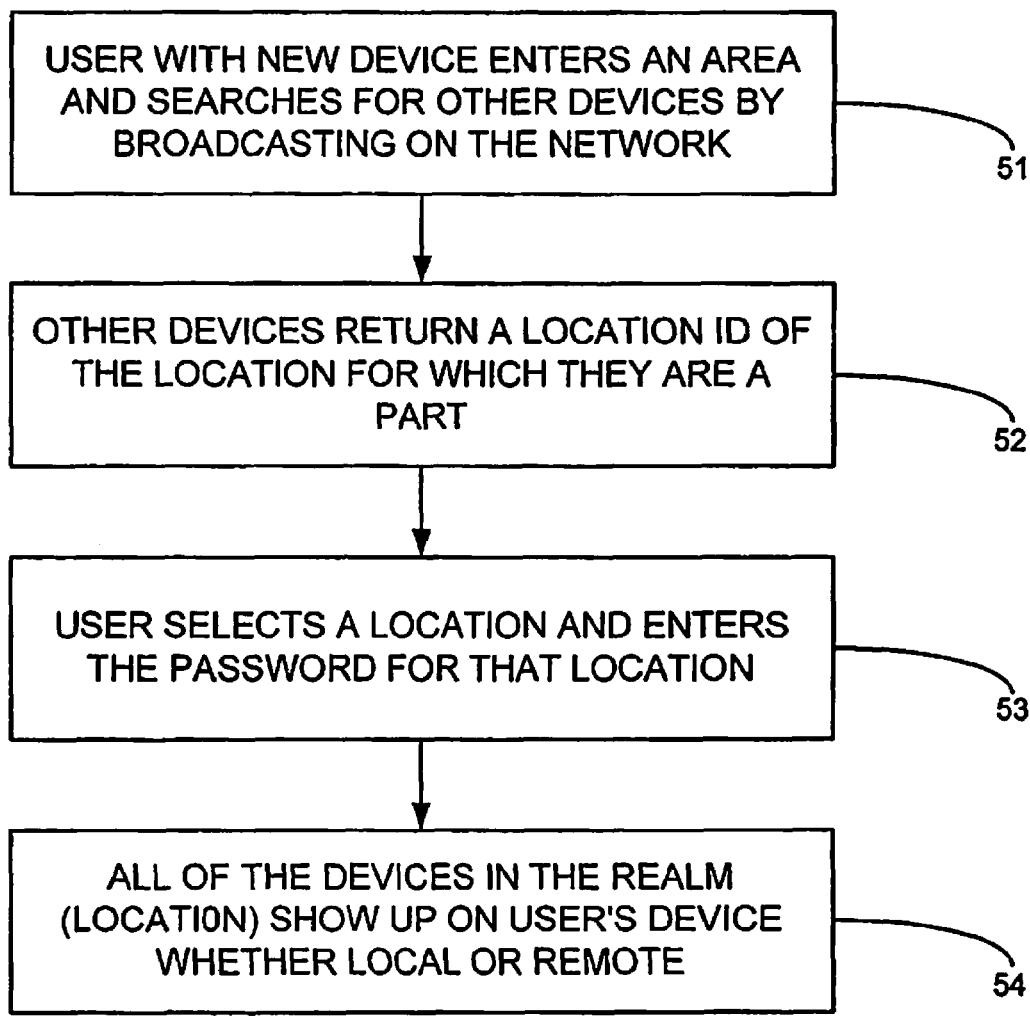
FIG. 5 is a flow chart showing operation of a discovery process wherein devices of the present invention recognize one another.

Referring now to FIG. 5, according to one aspect of the present invention all of the devices within an area, such as the area within which the devices can receive each other's wireless broadcast signals, are aware of one another and communicate with one another. When a new device enters the area, the existing devices become aware of the new device and the new device becomes aware of the existing devices via a discovery process.

According to this discovery process, all devices may periodically broadcast an identification code and a password. The identification code uniquely identifies the device. The password authorizes the device to communicate with other devices within the area.

When a new device enters the area, the new device and the existing devices communicate with one another. This may be done either directly or via a server, as discussed in detail below. The new device recognizes any of the other devices that have an acceptable password and displays a list of the other devices on its list of available devices, so that the other devices may be selected as second devices for playing of songs, as discussed above.

Similarly, the devices already in the area recognize the new device if the new device has an acceptable password, and the devices already in the area display the new device in their list of available devices so that the new device may be selected as a second device for the playing of songs, if desired.

Alternatively, when a user enters a place with a new device, he can search for other devices by broadcasting on the network (whether wired or wireless), as shown in block 51. The other devices will return a location ID for the location or realm of which they are a part, as shown in block 52. The user can then select a desired one of the locations and enter the correct password for that location, as shown in block 53. Once this is done, then all of the devices in that realm will show up regardless of whether they are local or remote, as shown in block 54. The user is then free to do whatever the user wants to do with the other devices, if the security is set up to allow other users to control the other devices. For example, the user may play a song through another device or download a song therefrom.

Figure 8:
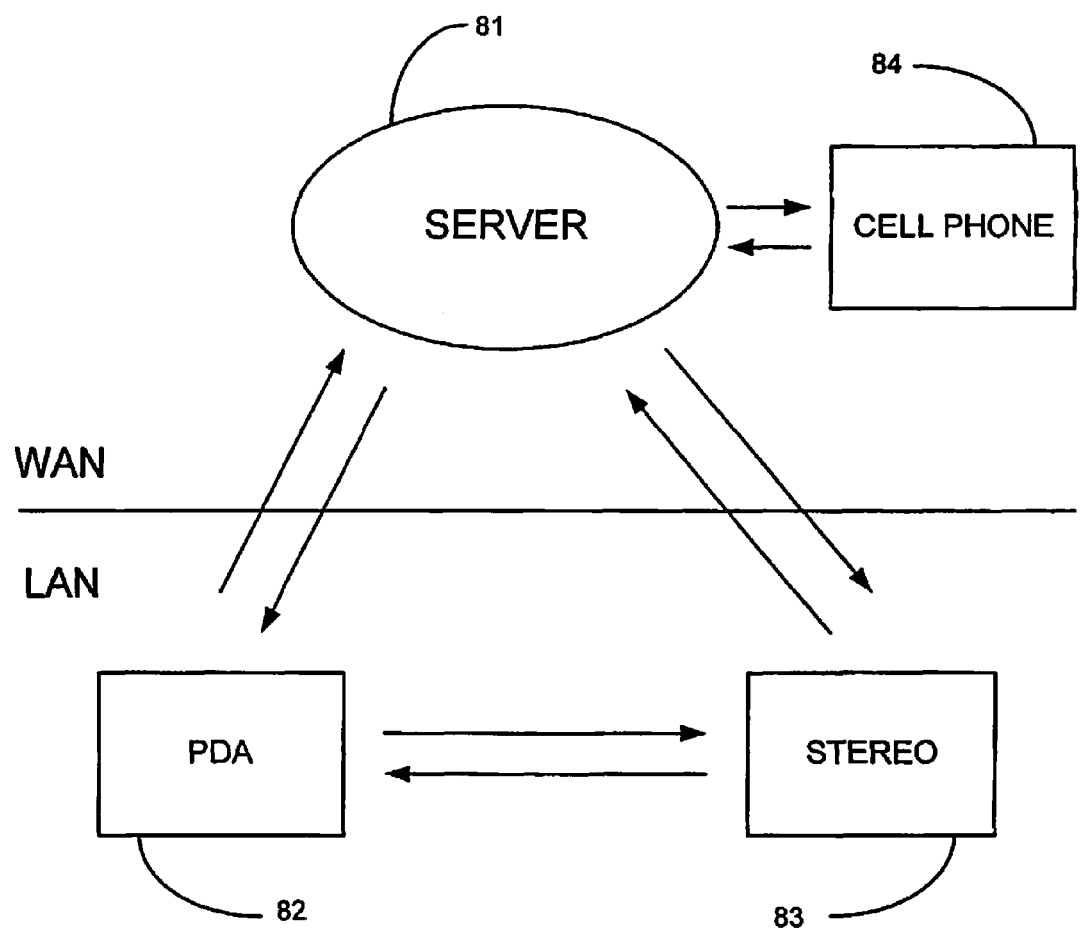
FIG. 8 is a block diagram showing the discovery process for both a local device and a remote device.

Referring now to FIG. 8, the discovery process is described in further detail. Preferably, a device can obtain a list of other devices in one of two different ways. According to a first way of obtaining lists of other devices, the lists are obtained through a server whether the device obtaining the lists is a local device or a remote device. According to a second way of obtaining lists of other devices, the lists are obtained directly from the other devices themselves, as long as the device obtaining the lists and the other devices are all local devices.

A local device is a device that is on the same local area network (LAN) as the other devices. That is, devices are considered to be local with respect to one another if they are all on the same local area network. A remote device is a device that is not on the same local area network as the other devices.

According to the first way of obtaining device lists, server 81, preferably on a wide area network such as the Internet, facilitates• communication of a list of devices to a new device. The server may be the same server as the playlist server/content server 10 of FIGS. 1, 6, and 7 or may be a different server.

For example, if PDA 82 is a new device entering the area of a wireless local area network, a user may enter a user name or ID, a location identifier, and a password into the PDA 82. The user name or ID identifies the user to the rest of the local area network. An example of a user name or ID would be Joes PDA.

The location entry identifies the network that the user wants to become part of. For example, a network at Joe's house may be conveniently named Joes House.

The password is typically necessary to be part of the local area network. That is, the local area network will typically not allow a new device to log thereon without the correct password. The use of passwords may optionally be omitted, if desired.

Once the appropriate ID, location, and password have been entered, then the POA 82 communicates with the server 81, such as via a wireless access point. The server 81 maintains a list of the devices on the local area network and communicates this list to the new device, i.e., the PDA 82.

The PDA 82 may then be used to select and control another device on the local area network, such as stereo 83. That is, the user may select the stereo 83 from the list of devices on the local area network and then may command the stereo to play a song or playlist of songs on the playlist •of the PDA 82. The PDA 82 may also be used to control parameters of the song being played on the stereo 83, such as volume, tone, and balance. The PDA 82 may also be used to control the order in which the songs are played.

The PDA 82 may directly control the stereo 83, as indicated by the arrows therebetween. Alternatively, the PDA 82 may control the stereo through the server 81, particularly in those instance wherein communication directly between the PDA 82 and the stereo 83 are not adequately facilitated, such as when the distance therebetween is too great or when an obstruction (such as a wall or a larger piece of furniture) blocks the signal between the PCA 82 and the stereo 83.

When a new device can become part of the local area network, as described above, then the new device is a local device. However, in some instances a remote device may similarly be used to control a device on the network such as the stereo 83, even though the remote device is not part of the local area network.

For example, the cell phone 84 is a remote device because it is not part of the local area network that the stereo 83 is on. However, the cell phone 84, may still communicate with the server 81, so as to obtain the list of devices on the local area network therefrom. It is still necessary for the cell phone user to enter an ID, location, and password into the cell phone, as was done with the PPA.

The remote device, i.e., cell phone 84, may similarly be used to control the stereo. However, the control signal will be communicated from the cell phone 84 to the server 81 through the server, since direct communication between the cell phone 84 and the stereo is typically not facilitated. Thus, the server 81 functions as a gateway for the remote device to communicate with devices on the local area network.

Preferably, the list of devices communicated from the server 81 to a new device. e.g., PDA, contains an indication as to whether devices on the list are local or remote with respect to the local area network. Thus, the new device knows whether commands to other devices must go through the server 81 or not.

According to the second way of obtaining a list of devices instead of obtaining the list from the server 81, each device continuously broadcasts its presence, so as to facilitate auto-detection thereof. Thus, each device individually compiles its own list of other devices by monitoring the broadcasts therefrom. Preferably, a user must enter an ID, location, and password, as discussed above.

According to either method for obtaining a list of devices, a particular physical location such as a coffee shop for example, may contain a plurality of logical locations or realms. Thus, a user may select a particular logical location to log onto. For example, one group of people at the coffee shop may be logged onto a location or local area network named Joes Coffee Group, while another group of people is logged onto a different location or local area network named Bills Coffee Group. A person newly entering the physical location, i.e., the coffee shop, may choose which group to join.

However; the new person must have the correct password for the logical location that he wishes to join. The password may be obtained by requesting it from someone in the logical location. Logging on to the logical location causes a list of devices (or users) to be communicated to the new user's device and also causes the new user's device to be added to the device lists of the other users as discussed above.

According to one embodiment of the present invention, the first device comprises a remote control for a set-top box and the second device comprises a rendering device that receives signals from the set-top, such as a television or stereo. This embodiment of •the present invention is illustrated in FIGS. 6 and 7 and is described in detail below.

Figure 6:
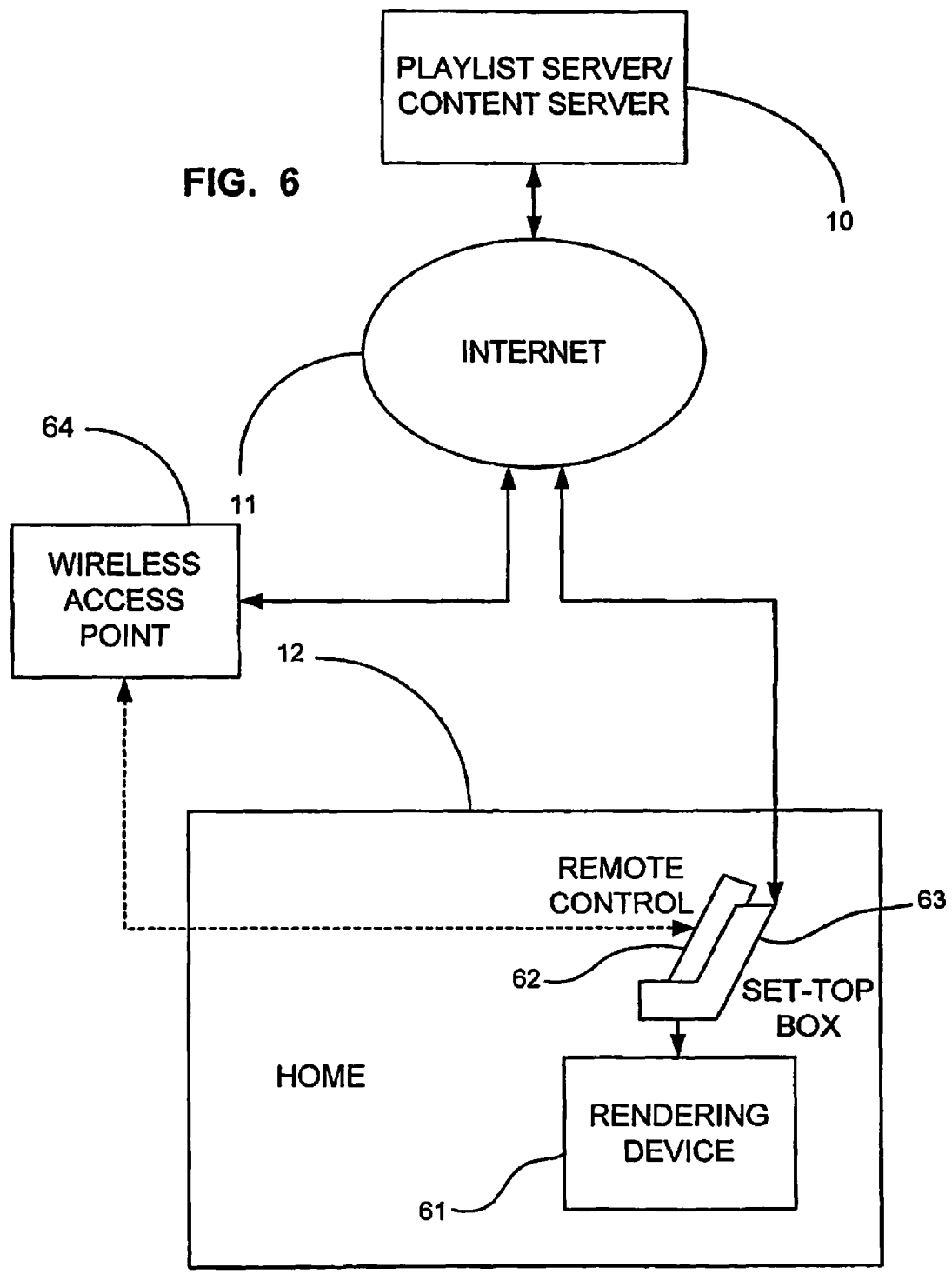
FIG. 6 is a block diagram showing an exemplary embodiment of the digital entertainment network of the present invention, wherein a set-top box has a removable remote control disposed within a cradle thereof.
Figure 7:
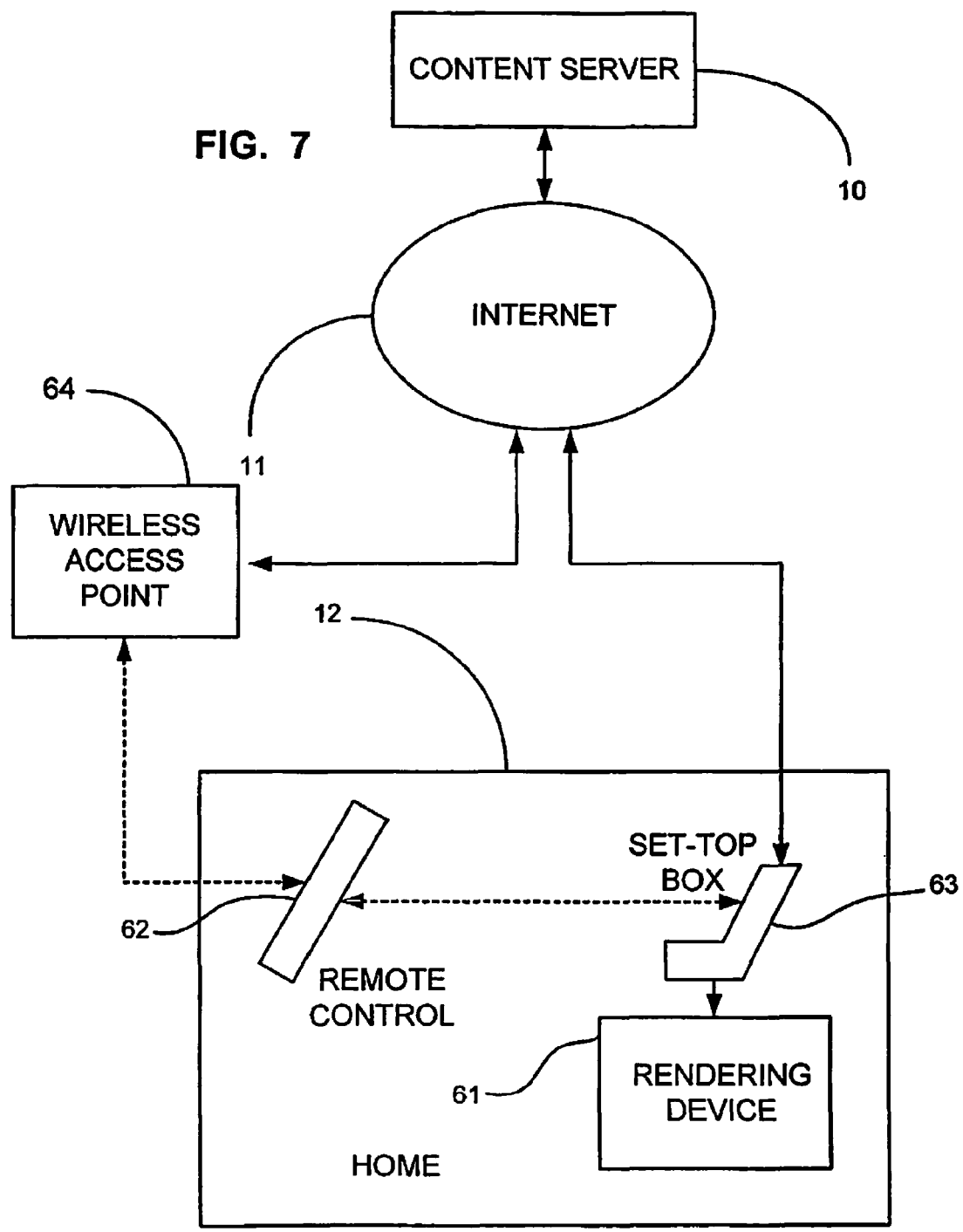
FIG. 7 is a block diagram showing the digital entertainment network of FIG. 6, wherein the set-top box pas the removable remote control disposed out of the cradle thereof.

Referring now to FIG. 6, one embodiment of the present invention comprises a set-top box 63 that provides a signal to a rendering device, such as a television or stereo 61. The set-top box is in communication with the Internet 11. A playlist server/content server 10 is also in communication with the Internet, as described above.

Optionally, the set-top box functions as a cable television box in addition to functioning as a portion of the digital entertainment_network of the present invention.

A remote control 62 for the set-top box 63 preferably fits into a cradle defined by at least a portion of the set-top box. The remote control 62 communicates wirelessly with the set-top box to control operation of the rendering device 61.

The remote control 62 is in wireless communication with the Internet 11, such as via a wireless access point or wireless router 64.

The remote control 62 defines a first device, as described in detail above. The set-top box, in combination with the rendering device 61, defines a second device as also described in detail above.

Thus, playlists can be requested by the remote control 62 and downloaded from the playlist server 10 via the Internet 11 thereto. Similarly, songs may•be downloaded to the remote control 62. The songs may be played on the remote control 62 or may be played on the rendering device 61 'in its role as a second device as described above.

[For example, a •song may be previewed on the remote control 62, even while another song is being played on the rendering device 61. A song may be listened to solely on the remote control 62 as the remote control is carried about at home. Such listening may be via one or more speakers built into the remote control 62 or may be via earphones.

Optionally, the set-top box comprises a display, so that playlists and •songs can be selected therefrom. Playlists and songs are downloaded to the set-top box in its role as a second device, as discussed above.

The remote control 62 may be used while cradled by the set-top box 63. As shown in FIG. 6. Alternatively, the remote control 62 may be used while removed from the set-top box 63, as shown in FIG. 7.

Chat is preferably provided by the first 13 and/or second 14 devices of the present invention. Chat may be used for collaboration among listeners, such as for the compilation and/or exchange of playlists. Such chat may be implemented as voice chat or as text chat in a fashion similar to Internet Relay Chat (IRC), Microsoft Instant Messenger (IM), or AOL Instant Messenger (IM).

According to one aspect of the present invention, playlist recommendations may be provided•to a listener. These playlist recommendations may be provided by the playlist server and may be based upon the listening habits of the listener or upon previous playlist requests. The listening habits of the listener may be determined from playlist and/or song downloads from the playlist server and/or the content server. That is, a playlist recommendation of a playlist of the top ten contemporary songs may be made by the playlist server to a listener who continually listens to several of the songs on this playlist. Similarly, a playlist recommendation of a playlist of the top ten country songs may be made to a listener who has requested playlists containing country songs.

The playlist server may also provide playlist recommendations based upon the playlists of others. That is, the playlist server may be configured to recognize when two or more people appear to have similar listening habits and may then recommend the playlists of one of these people to others of the same group.

The wireless communications discussed herein may be effected via a network, such as a network conforming to the Bluetooth {a trademark of Bluetooth SIG, Inc.) standard and/or conforming to the WiFi (a trademark of the WiFi Alliance) standard.

Communications between the first and second devices may be either via a network or via dedicated non-network communications devices such as those utilizing any desired form of wireless data transfer, including those using infrared (IR) and radio frequency (RF).

Although the content described herein is music, those skilled in the art will appreciate that other types of content, including both audio and non-audio content, are likewise subject to use by the present invention. For example, the content may comprise talks, speeches, comedy sketches, stories or books that are read aloud, pictures, video, software, or data.

It is understood that the exemplary digital entertainment network described herein and shown in the drawings represents only presently preferred embodiments of the invention. Indeed, various modifications and additions may be made to such embodiments without departing from the spirit and scope of the invention. Thus, various modifications and additions may be obvious to those skilled in the art and may be implemented to adapt the present invention for use in a variety of different applications.

I claim:

1. A mobile phone for facilitating a presentation of media the mobile phone comprising:
    a display for displaying, on a touchscreen of the mobile phone, a plurality of device identifiers for a plurality of devices;
    a network transceiver for facilitating communication between the mobile phone, a content server, and at least one of the plurality of devices on a network, the network transceiver operably in communication with the display, wherein the content server, the mobile phone, and the plurality of devices are separate devices;
    wherein the mobile phone is configured to facilitate:
        receiving user first input identifying one of the plurality of device identifiers that identifies a rendering device on the network;

providing information identifying a user of the mobile phone to the content server;
requesting a playlist comprising a plurality of media item identifiers, the playlist based on the information identifying the user of the mobile phone;
receiving the playlist;
receiving, at the mobile phone, user second input identifying at least one media item identifier from the playlist;
directing, from the mobile phone, the rendering device identified by the one of the plurality of device identifiers to obtain a media item identified by the at least one media item identifier from the content server and to play the media item, the media item obtained without user input at the rendering device; and
effecting a display of information identifying a plurality of activities of an other user of an other control device,
wherein the mobile phone and the rendering device are connected to the content server through the Internet, and the mobile phone is connected to the rendering device through a LAN over a wireless network using TCP/IP.

2. The mobile phone of claim 1 wherein the playlist is a list of media items ordered to be played in an arranged sequence.

3. The mobile phone of claim 2 wherein based on user input received at the mobile phone, the mobile phone directs the rendering device to play the playlist in the arranged sequence.

4. The mobile phone of claim 2 wherein based on user input received at the mobile phone, the mobile phone directs the rendering device to play the playlist in random order.

5. The mobile phone of claim 2 wherein based on user input received at the mobile phone, the mobile phone reorders the playlist to play in an alternative sequence.

6. The mobile phone of claim 5 wherein the mobile phone directs the rendering device to play the playlist in the alternative sequence.

7. The mobile phone of claim 2 wherein each media item identifier of the plurality of media item identifiers comprises first information identifying a name of the media item and second information identifying a URL of the media item.

8. The mobile phone of claim 1 wherein the playlist is received as a recommendation.

9. The mobile phone of claim 8 the recommendation of the playlist is based upon listening habits of the user of the mobile phone.

10. The mobile phone of claim 1 wherein the content server and a playlist server are embodied in one machine and the playlist is received from the content server.

11. The mobile phone of claim 1 wherein the content server and a playlist server are embodied in different machines and the playlist is received from the playlist server.

12. The mobile phone of claim 10 wherein the playlist is determined by the content server based on matching the user of the mobile phone to an other user of an other control device.

13. The mobile phone of claim 10 wherein the playlist is received from an other control device of an other user.

14. The mobile phone of claim 1 wherein in order to request the playlist the mobile phone is further configured to facilitate:
providing a parameter to the content server to determine the playlist.

15. The mobile phone of claim 14 wherein the parameter is one of a playlist name, a playlist identifier, a playlist attribute, a media type, a search parameter, and information identifying an other user of an other control device.

16. The mobile phone of claim 1 wherein the rendering device is one of a standalone wireless speaker, a television, and a stereo.

17. The mobile phone of claim 1 wherein the plurality of activities of the other user of the other control device occurs over a period of time.

18. The mobile phone of claim 1 wherein the plurality of activities of the other user of the other control device are updated in real-time.

19. The mobile phone of claim 1 wherein the mobile phone caches the playlist.

20. The mobile phone of claim 1 wherein the mobile phone caches a plurality of songs.

21. The mobile phone of claim 1 wherein the mobile phone comprises a remote control operative to control the rendering device.

22. The mobile phone of claim 21 wherein the mobile phone is operative to adjust a volume parameter on the rendering device.

23. The mobile phone of claim 21 wherein the mobile phone is operative to adjust a tone parameter on the rendering device.

24. The mobile phone of claim 21 wherein the mobile phone is operative to adjust a balance parameter on the rendering device.

25. The mobile phone of claim 1 wherein the mobile phone is further configured to facilitate displaying a plurality of device identifiers on the mobile phone, wherein each of the plurality of device identifiers identifies a corresponding device, and wherein receiving the user first input selecting the one of the plurality of device identifiers further comprises receiving the user first input selecting the one of the plurality of device identifiers from the plurality of device identifiers.

26. The mobile phone of claim 1 wherein the user second input selects the plurality of media item identifiers from the playlist in a first order; and wherein directing the rendering device to receive the media item identified by the at least one media item identifier from the content server further comprises directing the rendering device to receive a plurality of media items identified by the plurality of media item identifiers from the content server in the first order.

27. The mobile phone of claim 21 wherein the user second input selects the plurality of media item identifiers from the playlist in a first order; and wherein directing the rendering device to receive the media item identified by the at least one media item identifier from the content server further comprises directing the rendering device to receive a plurality of media items identified by the plurality of media item identifiers from the content server in an order other than the first order.

28. The mobile phone of claim 21 wherein directing the rendering device to receive the media item identified by the at least one media item identifier from the content server further comprises directing the rendering device to download the media item identified by the at least one media item identifier from the content server.

29. The mobile phone of claim 1, wherein directing the rendering device to receive the media item identified by the at least one media item identifier from the content server further comprises directing the rendering device to stream the media item identified by the at least one media item identifier from the content server.

30. A mobile phone for facilitating a presentation of media, the mobile phone comprising:

a display for displaying, on a touchscreen of the mobile phone, a plurality of device identifiers of a plurality of devices;

a network transceiver for facilitating communication between the mobile phone, a content server, and at least one of the plurality of devices on a network, the network transceiver operably in communication with the display;

wherein the mobile phone is configured to facilitate:
  receiving user first input identifying one of the plurality of device identifiers, wherein the one of the plurality of device identifiers identifies a rendering device, wherein the content server, the mobile phone, and the rendering device are separate devices;
  providing information identifying a user of the mobile phone;
  receiving a message based on the information identifying the user of the mobile phone, the message comprising information identifying a playlist comprising a plurality of media item identifiers;
  receiving, at the mobile phone, user second input identifying at least one media item identifier from the playlist;
  directing, from the mobile phone, the rendering device identified by the one of the plurality of device identifiers to obtain a media item identified by the at least one media item identifier from a content server and to play the media item, the media item obtained without user input at the rendering device; and
  effecting a display of information identifying a plurality of activities of an other user of an other control device, wherein the mobile phone and the rendering device are connected to the content server through the Internet, and the mobile phone is connected to the rendering device through a LAN over a wireless network using TCP/IP.

31. The mobile phone of claim 30 wherein the playlist is a list of media items ordered to be played in an arranged sequence.

32. The mobile phone of claim 31 wherein based on user input received at the mobile phone, the mobile phone directs the rendering device to play the playlist in the arranged sequence.

33. The mobile phone of claim 31 wherein based on user input received at the mobile phone, the mobile phone directs the rendering device to play the playlist in random order.

34. The mobile phone of claim 31 wherein based on user input received at the mobile phone, the mobile phone reorders the playlist into a reordered sequence.

35. The mobile phone of claim 34 wherein the mobile phone directs the rendering device to play the playlist in the reordered sequence.

36. The mobile phone of claim 31 wherein each media item identifier of the plurality of media item identifiers comprises first information identifying a name of the media item and second information identifying a URL of the media item.

37. The mobile phone of claim 30 wherein the playlist is received as a recommendation.

38. The mobile phone of claim 30 wherein the rendering device is one of a standalone wireless speaker, a television, and a stereo.

39. The mobile phone of claim 30 wherein the content server and a playlist server are embodied in one machine and the playlist is received from the content server.

40. The mobile phone of claim 30 wherein the content server and a playlist server are embodied in different machines and the playlist is received from the playlist server.

41. The mobile phone of claim 30 wherein the plurality of activities of the other user of the other control device occurs over a period of time.

42. The mobile phone of claim 30 wherein the plurality of activities of the other user of the other control device are updated in real-time.

43. A computer implemented method of facilitating a presentation of media, the method comprising:
  displaying, on a touchscreen of a mobile phone, a plurality of device identifiers;
  receiving user first input identifying one of the plurality of device identifiers, wherein the one of the plurality of device identifiers identifies a rendering device, wherein the rendering device is one of a standalone wireless speaker, a television, and a stereo;
  providing information identifying a user of the mobile phone to a content server via the Internet, wherein the mobile phone, the rendering device, and the content server are separate devices;
  requesting a playlist based on the information identifying the user of the mobile phone, the playlist comprising a plurality of media item identifiers corresponding to media items ordered to be played in an arranged sequence;
  receiving the playlist;
  receiving, at the mobile phone, user second input identifying at least one media item identifier from the playlist;
  directing the rendering device, from the mobile phone via a LAN over a wireless network using TCP/IP, to obtain a media item identified by the at least one media item identifier from the content server, via the Internet, and to play the media item, the media item obtained without user input at the rendering device; and
  effecting display of information identifying a plurality of activities of an other user of an other control device.

44. The computer implemented method of claim 43 wherein each media item identifier of the plurality of media item identifiers comprises first information identifying a name of the media item and second information identifying a URL of the media item.

45. The method of claim 43 wherein the rendering device is one of a standalone wireless speaker, a television, and a stereo.

46. A method of facilitating a presentation of media, the method comprising:
  displaying, on a touchscreen of a mobile phone, a plurality of device identifiers;
  receiving user first input identifying one of the plurality of device identifiers, wherein the one of the plurality of device identifiers identifies a rendering device, wherein the rendering device is one of a standalone wireless speaker, a television, and a stereo;
  providing information identifying a user of the mobile phone to a content server via the Internet, wherein the content server, the mobile phone, and the rendering device are separate devices;
  receiving, at the mobile phone, an instant messaging chat message based on the information identifying the user of the mobile phone, the message comprising information identifying a playlist, the playlist comprising a plurality of media item identifiers corresponding to media items ordered to be played in an arranged sequence, the instant messaging chat message provided by an other control device of an other user;

receiving, at the mobile phone, user second input identifying at least one media item identifier from the playlist; and directing the rendering device, from the mobile phone via a LAN over a wireless network using TCP/IP, to obtain a media item identified by the at least one media item identifier from a content server via the Internet and to play the media item, the media item obtained without user input at the rendering device.

47. The method of claim 46 wherein each media item identifier of the plurality of media item identifiers comprises first information identifying a name of the media item and second information identifying a URL of the media item.

48. A non-transitory computer readable medium embodied in an article of manufacture and storing software adapted to execute on a controller to:
    display, on a touchscreen of a mobile phone, a plurality of device identifiers;
    receive user first input identifying one of the plurality of device identifiers, wherein the one of the plurality of device identifiers identifies a rendering device, wherein the rendering device is one of a standalone wireless speaker, a television, and a stereo;
    provide information identifying a user of the mobile phone to a content server via the Internet, wherein the content server, the mobile phone, and the plurality of devices are separate devices;
    request a playlist based on the information identifying the user of the mobile phone;
    receive the playlist, the playlist comprising a plurality of media item identifiers corresponding to media items ordered to be played in an arranged sequence;
    receive, at the mobile phone, user second input identifying at least one media item identifier from the playlist;
    direct the rendering device, from the mobile phone via a LAN over a wireless network using TCP/IP, to obtain a media item identified by the at least one media item identifier from a content server via the Internet and to play the media item, the media item obtained without user input at the rendering device; and
    effecting display of information identifying a plurality of activities of an other user of an other control device.

49. The computer readable medium of claim 48 wherein each media item identifier of the plurality of media item identifiers comprises first information identifying a name of the media item and second information identifying a URL of the media item.

50. A non-transitory computer readable medium storing software for instructing a controller of a mobile phone to:
    display, on a touchscreen of a mobile phone, a plurality of device identifiers;
    receive user first input identifying one of the plurality of device identifiers, wherein the one of the plurality of device identifiers identifies the rendering device, wherein the rendering device is one of a standalone wireless speaker, a television, and a stereo;
    provide information identifying a user of the mobile phone to a content server via the Internet, wherein the content server, the mobile phone, and the plurality of devices are separate devices;
    receive, at the mobile phone, an instant messaging chat message based on the information identifying the user of the mobile phone, the message comprising information identifying a playlist, the playlist comprising a plurality of media item identifiers corresponding to media items ordered to be played in an arranged sequence, the instant messaging chat message provided by an other control device of an other user;
    receive, at the mobile phone, user second input identifying at least one media item identifier from the playlist; and
    direct the rendering device, from the mobile phone via a LAN over a wireless network using TCP/IP, to obtain a media item identified by the at least one media item identifier from a content server via the Internet and to play the media item, the media item obtained without user input at the rendering device.

51. The computer readable medium of claim 50 wherein each media item identifier of the plurality of media item identifiers comprises first information identifying a name of the media item and second information identifying a URL of the media item.

52. A system comprising:
    a content server comprising:
        a first network transceiver for facilitating communication between the content server, a mobile phone, and a rendering device, wherein the content server is configured to:
            receive, from the mobile phone, a request for a playlist;
            provide, to the mobile phone, the playlist;
    the mobile phone comprising:
        a second network transceiver for facilitating communication between the mobile phone, the content server, and the rendering device, wherein the mobile phone is configured to:
            display, on a touchscreen of the mobile phone, a plurality of device identifiers;
            receive user first input identifying one of the plurality of device identifiers, wherein the one of the plurality of device identifiers identifies the rendering device;
            request a playlist based on information identifying a user of the mobile phone, the playlist comprising a plurality of media item identifiers;
            receive the playlist;
            receive, at the mobile phone, user second input identifying at least one media item identifier from the playlist;
            direct, from the mobile phone, the rendering device to obtain a media item identified by the at least one media item identifier from the content server and to play the media item, the media item obtained without user input at the rendering device; and
            effecting display of information identifying a plurality of activities of an other user of an other control device
    the rendering device comprising:
        a third network transceiver for facilitating communication between the rendering device, the content server, and the mobile phone, wherein the rendering device is configured to:
            provide, to the mobile phone, the device identifier for the rendering device;
            receive, from the mobile phone, the playlist, the playlist comprising a plurality of media item identifiers;

obtain, from the content server, at least one media item indicated by a media item identifier of the plurality of media item identifiers comprising the playlist; and render the at least one media item;

wherein the content server, the mobile phone, and the rendering device are all separate devices, and wherein the mobile phone and the rendering device are connected to the content server through the Internet, and the mobile phone is connected to the rendering device through a LAN over a wireless network using TCP/IP.

53. The system of claim 52 wherein in order to provide the playlist to the mobile phone, the mobile phone is further configured to:

provide information identifying a user of the mobile phone to the content server; and the content server is further configured to:

receive, from the mobile phone, information identifying a user of the mobile phone; and determine the playlist based on the information identifying the user, the playlist comprising a plurality of media item identifiers.

54. The system of claim 52 wherein in order to provide the playlist to the mobile phone the mobile phone is further configured to:

provide information identifying a user of the mobile phone to the content server; and the content server is further configured to:

receive, from the mobile phone, a profile of the user of the mobile phone;

receive, from an other control device, an other profile of an other user of the other control device;

match the profile of the user of the mobile phone to the profile of the other user of the other control device; and based on a profile match, provide, to the mobile phone, an other playlist of the other user of the other control device.

55. The system of claim 52 wherein in order to provide the playlist to the mobile phone the mobile phone is further configured to:

provide information identifying a user of the mobile phone to the content server; and the content server is further configured to:

receive, from an other control device of an other user, a chat message, the chat message comprising information identifying the playlist; and provide, to the mobile phone.

56. The system of claim 52 wherein the content server is further configured to:

receive, from the mobile phone of the user, a subscription request, wherein the subscription comprises streaming content and usage;

receive, from the mobile phone of the user, payment information;

automatically bill the user for the subscription;

notify, from the mobile phone of the user, if a payment transaction for the subscription does not complete successfully; and provide funds to content providers.

57. The system of claim 52 wherein the playlist is a list of media items ordered to be played in an arranged sequence.

58. The system of claim 57 wherein based on user input received at the mobile phone, the mobile phone directs the rendering device to the playlist in the arranged sequence.

59. The system of claim 57 wherein based on user input received at the mobile phone, the mobile phone directs the rendering device to the playlist in random order.

60. The system of claim 57 wherein based on user input received at the mobile phone, the mobile phone reorders the playlist into a reordered sequence.

61. The system of claim 57 wherein the mobile phone directs the rendering device to play the playlist in the reordered sequence.

62. The system of claim 57 wherein each media item identifier of the plurality of media item identifiers comprises first information identifying a name of the media item and second information identifying a URL of the media item.

63. The system of claim 52 wherein the content server and a playlist server are embodied in one machine and the playlist is received from the content server.

64. The system of claim 52 wherein the content server and a playlist server are embodied in different machines and the playlist is received from the playlist server.

65. The system of claim 52 wherein the rendering device is one of a standalone wireless speaker, a television, and a stereo.

* * * * *